United States Patent
Qiu

(10) Patent No.: US 9,113,298 B2
(45) Date of Patent: Aug. 18, 2015

(54) GEOFENCE WITH KALMAN FILTER

(71) Applicant: TeleCommunication Systems, Inc., Annapolis, MD (US)

(72) Inventor: Weigen Qiu, Calgary (CA)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 13/783,719

(22) Filed: Mar. 4, 2013

(65) Prior Publication Data

US 2013/0331128 A1 Dec. 12, 2013

Related U.S. Application Data

(60) Provisional application No. 61/658,584, filed on Jun. 12, 2012.

(51) Int. Cl.
*H04W 24/00* (2009.01)
*H04W 4/02* (2009.01)

(52) U.S. Cl.
CPC ..................... *H04W 4/021* (2013.01)

(58) Field of Classification Search
CPC ..................................... H04W 4/021
USPC .......... 455/456.1–457, 404.1–404.2, 455/414.1–414.4; 342/357.23; 701/480, 701/510, 536
See application file for complete search history.

(56) References Cited

U.S. PATENT DOCUMENTS

| | | | |
|---|---|---|---|
| 6,385,454 B1 * | 5/2002 | Bahl et al. ................. 455/450 |
| 6,415,223 B1 * | 7/2002 | Lin et al. ................... 701/431 |
| 7,415,354 B2 * | 8/2008 | Alexander ................. 701/474 |
| 7,711,476 B2 * | 5/2010 | Chiou et al. ............... 701/480 |
| 8,019,532 B2 | 9/2011 | Sheha |
| 8,396,485 B2 * | 3/2013 | Grainger et al. .......... 455/456.1 |
| 2003/0216865 A1 * | 11/2003 | Riewe et al. .............. 701/220 |
| 2009/0227266 A1 * | 9/2009 | Baik et al. ................. 455/456.1 |
| 2010/0127919 A1 | 5/2010 | Curran |
| 2010/0203901 A1 | 8/2010 | Dinoff |
| 2011/0148634 A1 * | 6/2011 | Putz .......................... 340/541 |
| 2011/0178701 A1 * | 7/2011 | Gupta et al. .............. 701/204 |
| 2013/0035110 A1 * | 2/2013 | Sridhara et al. .......... 455/456.1 |
| 2014/0226855 A1 * | 8/2014 | Savvides et al. ......... 382/103 |
| 2014/0274115 A1 * | 9/2014 | Michalson et al. ....... 455/456.1 |
| 2014/0274135 A1 * | 9/2014 | Edge et al. ............... 455/456.2 |

* cited by examiner

*Primary Examiner* — Sharad Rampuria
(74) *Attorney, Agent, or Firm* — William H. Bollman

(57) ABSTRACT

A least squares geofence method that minimizes trigger misfires caused by data variability and location blunders and minimizes delayed/missed entry triggers generated under urban or indoor conditions. The least squares geofence method uses a weighted least squares (LS) model to compute a location estimate for a target device. A LS location estimate is used to determine if a target device is located inside or outside a predefined geofence. The present invention additionally comprises a Kalman filter geofence method that further improves the accuracy of entry/exit geofence triggers. A Kalman filter geofence method uses a Kalman filter to filter location data retrieved for a target device. Filtered location data is used to determine if a target device is located inside or outside a predefined geofence. A Kalman filter geofence method estimates velocity and heading information for a target device to generate accurate entry/exit geofence triggers for devices in fast moving mode.

6 Claims, 31 Drawing Sheets

*FIG. 16*

```
[2011/10/17 0:34:30 - DEBUG] -122.14657,47.55074,17.09000015258789
[2011/10/17 0:34:38 - DEBUG] -122.14662,47.55064,3.609999895095825
[2011/10/17 0:34:46 - DEBUG] -122.14659,47.55064,5.0
[2011/10/17 0:34:54 - DEBUG] -122.14659,47.55064,5.0
[2011/10/17 0:35:2  - DEBUG] -122.14659,47.55064,7.210000038146973
[2011/10/17 0:38:20 - DEBUG] -122.14666,47.55061,8.9399995803833
[2011/10/17 0:41:37 - DEBUG] -122.14647,47.55068,32.97999954223633
[2011/10/17 0:44:55 - DEBUG] -122.14646,47.55068,26.829999923706055
[2011/10/17 0:48:13 - DEBUG] -122.14646,47.55068,48.369998931884766
[2011/10/17 0:51:31 - DEBUG] -122.14646,47.55067,24.329999923706055
[2011/10/17 0:54:48 - DEBUG] -122.14645,47.55067,48.09000015258789
[2011/10/17 0:58:7  - DEBUG] -122.14645,47.55067,20.0
[2011/10/17 1:1:25  - DEBUG] -122.14636,47.5507,13.420000076293945
[2011/10/17 1:4:42  - DEBUG] -122.14644,47.55067,26.829999923706055
[2011/10/17 1:8:0   - DEBUG] -122.14626,47.55068,14.420000076293945
[2011/10/17 1:11:18 - DEBUG] -122.14635,47.55063,13.420000076293945
[2011/10/17 1:14:51 - DEBUG] -122.14622,47.55053,53.66999816894531
[2011/10/17 1:18:24 - DEBUG] -122.14626,47.55046,5.0
[2011/10/17 1:21:41 - DEBUG] -122.14626,47.55048,13.420000076293945
[2011/10/17 1:24:58 - DEBUG] -122.14623,47.5505,13.420000076293945
```

[2011/10/17 1:28:16 - DEBUG] -122.14626,47.55051,20.0
[2011/10/17 1:31:34 - DEBUG] -122.14627,47.55052,20.0
[2011/10/17 1:34:52 - DEBUG] -122.14626,47.55051,14.420000076293945
[2011/10/17 1:38:10 - DEBUG] -122.14626,47.5505,17.09000015258789
[2011/10/17 1:41:28 - DEBUG] -122.14626,47.55051,24.739999771118164
[2011/10/17 1:44:46 - DEBUG] -122.14626,47.55051,13.420000076293945
[2011/10/17 1:48:3 - DEBUG] -122.14627,47.55053,16.969999313354492
[2011/10/17 1:51:21 - DEBUG] -122.14628,47.55053,25.299999237060547
[2011/10/17 1:54:39 - DEBUG] -122.14629,47.55053,20.0
[2011/10/17 1:57:56 - DEBUG] -122.14629,47.55053,17.09000015258789
[2011/10/17 2:1:14 - DEBUG] -122.14628,47.55053,16.969999313354492
[2011/10/17 2:4:32 - DEBUG] -122.14629,47.55055,26.829999923706055
[2011/10/17 2:7:50 - DEBUG] -122.14629,47.55055,20.0
[2011/10/17 2:11:7 - DEBUG] -122.14629,47.55055,17.889999389648438
[2011/10/17 2:14:25 - DEBUG] -122.14629,47.55055,28.84000015258789
[2011/10/17 2:17:43 - DEBUG] -122.14629,47.55055,17.889999389648438
[2011/10/17 2:21:1 - DEBUG] -122.14629,47.55055,25.299999237060547
[2011/10/17 2:24:19 - DEBUG] -122.14629,47.55055,25.299999237060547
[2011/10/17 2:27:37 - DEBUG] -122.14629,47.55055,24.329999923706055
[2011/10/17 2:30:55 - DEBUG] -122.14629,47.55055,24.739999771118164

*FIG. 17*

```
[2011/10/17 14:10:0  - DEBUG] -122.34976,47.61285,13.420000076293945
[2011/10/17 14:10:9  - DEBUG] -122.34988,47.61304,17.090000015258789
[2011/10/17 14:10:18 - DEBUG] -122.34986,47.61302,14.420000076293945
[2011/10/17 14:10:28 - DEBUG] -122.34986,47.61302,14.420000076293945
[2011/10/17 14:11:6  - DEBUG] -122.34971,47.61498,543.0599975585938
[2011/10/17 14:15:22 - DEBUG] -122.34766,47.61464,461.510009765625
[2011/10/17 14:19:59 - DEBUG] -122.34982,47.61309,461.510009765625
[2011/10/17 14:24:36 - DEBUG] -122.34812,47.61503,271.5299987792969
[2011/10/17 14:28:51 - DEBUG] -122.35235,47.61017,461.510009765625
[2011/10/17 14:33:29 - DEBUG] -122.35407,47.61633,1448.1500244140625
[2011/10/17 14:38:6  - DEBUG] -122.3515,47.61161,858.6500244140625
[2011/10/17 14:42:20 - DEBUG] -122.34782,47.61449,429.3299865722656
[2011/10/17 14:46:34 - DEBUG] -122.35286,47.60992,320.0
[2011/10/17 14:50:49 - DEBUG] -122.34764,47.61474,429.3299865722656
[2011/10/17 14:55:5  - DEBUG] -122.34743,47.6152,461.510009765625
[2011/10/17 14:59:37 - DEBUG] -122.35215,47.6105,320.0
[2011/10/17 15:3:49  - DEBUG] -122.35431,47.61189,572.4299926757812
[2011/10/17 15:8:4   - DEBUG] -122.3481,47.61351,320.0
[2011/10/17 15:12:18 - DEBUG] -122.35009,47.61121,320.0
[2011/10/17 15:16:35 - DEBUG] -122.35154,47.61151,461.510009765625
[2011/10/17 15:20:51 - DEBUG] -122.35233,47.60992,429.3299865722656
[2011/10/17 15:25:4  - DEBUG] -122.35348,47.61008,543.0599975585938
```

GEOFENCE WITH KALMAN FILTER

The present invention claims priority from U.S. Provisional Application No. 61/658,584 to Weigen Qiu, entitled "Geofence with Kalman Filter" filed Jun. 12, 2012, the entirety of which is expressly incorporated by reference.

BACKGROUND OF THE INVENTION

1. Field of the Invention

This invention relates generally to communications. More particularly, it relates to location-based services.

2. Background of Related Art

Location enabling technology is implemented in a vast majority of today's handheld mobile devices as a result of a Federal Communications Commission (FCC) mandate requiring wireless devices to incorporate location technology, in the event wireless users need to be located throughout use of emergency services, e.g., E911. Location enabling technologies generally implemented in mobile devices include a precise satellite-enabled Global Positioning System (GPS), cell tower positioning, network access points, and several other tracking technologies capable of delivering approximate location of a wireless device. This vast incorporation of location enabling technology in today's handheld mobile devices has consequently led to a growing emergence of location based services (LBS). A location based service (LBS) obtains a geographic location of a wireless device and provides services accordingly.

For instance, a geofence method is an existing location based service (LBS) that monitors location information for a wireless device, and enables an administrator to trigger a predetermined event each instance that monitored device enters/exits a specified geographic location.

To implement a geofence method, an administrator defines a geofence (i.e. a virtual boundary) around a geographic location of interest (e.g., a point on a map, a school campus, a state, etc.), and articulates one or more target devices to monitor against that predefined geofence. A geofence administrator additionally defines one or more entry/exit events for each desired target device/geofence combination.

In operation, whenever a geofence method detects a target device entering/exiting a predefined geofence, the geofence method automatically generates an entry/exit trigger, to trigger delivery of a predetermined entry/exit event defined for that particular target device/geofence combination. An entry/exit event may be, e.g., an advertisement, digital coupon, reminder, etc., triggered to a target device entering/exiting a relevant geofence. Moreover, an entry/exit event may additionally/alternatively be, e.g., an alert, reminder, notification, etc., triggered to a relevant geofence administrator.

A conventional geofence method periodically retrieves sample location points for a given target device to determine that device's geographic location and trigger entry/exit events accordingly. More particularly, the geofence method uses three consecutive fast location fixes to evaluate a geofence side condition (e.g. inside, outside, unknown, etc.) for a specified target device. If the value of a geofence side condition is 'inside' for a particular target device, that device is currently located inside a predefined geofence. Likewise, if the value of a geofence side condition is 'outside' for a particular target device, that device is currently located outside a predefined geofence. An entry/exit event is triggered whenever a change in side condition is detected for a particular target device.

FIG. 19 depicts a conventional geofence method call flow.

In particular, a geofence method first determines an initial geofence side condition (e.g. 'inside' or 'outside' a predefined geofence) for a target device based on sample location points previously retrieved for that particular device, as shown in step 1. Following determination of an initial geofence side condition, the geofence method enters a slow fix mode and retrieves a slow location fix (i.e. a sample location point) for the specified target device, as depicted in step 2. In step 3, the geofence method analyzes the slow location fix (i.e. sample location point) retrieved in step 2, to determine a current geofence side condition (e.g. inside, outside, unknown, etc.) for the relevant target device.

In step 4, the geofence method compares the current geofence side condition determined in step 3 to the initial geofence side condition determined in step 1. If the current geofence side condition and the initial geofence side condition have the same value (i.e. both side conditions are 'inside' or both side conditions are 'outside'), the geofence method call flow loops back to step 1 and the value of the initial geofence side condition (e.g. 'inside' or 'outside') remains unchanged.

Alternatively, if the current geofence side condition (e.g. 'inside' or 'outside') determined in step 3 and the initial geofence side condition determined in step 1 differ, the geofence method enters a fast fix mode to investigate a potential side change.

To investigate a potential side change, the geofence method retrieves three consecutive fast location fixes for the specified target device, as depicted in steps 5, 6, and 7. The geofence method subsequently evaluates three individual side conditions for each fast location fix retrieved, and then analyzes retrieved location fixes and evaluated side conditions to determine a final geofence side condition for the specified target device, as depicted in step 8. If location error areas for all three fast location fixes are overlapped with the geofence independently, the geofence method determines that the target device is located inside that predefined geofence.

FIG. 20 depicts three fast location fixes retrieved for a target device that is determinately located inside a predefined geofence.

In particular, if location error areas 201 for all three fast location fixes retrieved for a target device are independently overlapped with a geofence 203 (as depicted in FIG. 20), the final geofence side condition for that target device is 'inside'.

FIG. 21 depicts three fast location fixes retrieved for a target device that is determinately located outside a predefined geofence.

In particular, if location error areas 205 for all three fast location fixes retrieved for a target device are not independently overlapped with a geofence 203 (as depicted in FIG. 21), the final geofence side condition for that target device is 'outside'.

In step 9 (FIG. 19), the geofence method compares the final geofence side condition determined in step 8 to the initial geofence side condition determined in step 1. If the final geofence side condition and the initial geofence side condition have the same value (i.e. both side conditions are 'inside' or both side conditions are 'outside'), the geofence method call flow loops back to step 1 and the value of the initial geofence side condition (e.g. 'inside' or 'outside') remains unchanged.

Alternatively, if the final geofence side condition determined in step 8 and the initial geofence side condition determined in step 1 differ, an appropriate geofence event is triggered, as depicted in step 10.

In step 11, the geofence method sets the value of the initial geofence side condition equivalent to the value of the final geofence side condition (determined in step 8), and the geofence method call flow loops back to step 1.

A user may desire to implement a conventional geofence method for any of a multitude of reasons. For instance, a geofence method may be implemented to trigger digital coupons to a target device when that device is within close proximity to a predefined geofence, i.e., a store, restaurant, city, etc. Moreover, a geofence method may enable family members to monitor location information for other family members and/or employers to track employee whereabouts. In addition, a geofence method may trigger offers/discounts to participating consumers for businesses/stores within those consumers' general vicinity. Furthermore, a geofence method may enable law enforcement to better monitor tracking devices and/or a homeowner to remotely activate/deactivate home appliances when a relevant device enters/exits a relevant geofence.

Although a geofence method does encompass numerous advantageous uses, current geofence methods unfortunately experience occasional trigger misfires as a result of data variability and/or location blunders. In addition, current geofence methods occasionally generate delayed/missed entry triggers when performed under urban and/or indoor conditions. As a result, the present inventors have appreciated that there is a need for an improved geofence method that generates entry/exit geofence triggers more accurately without adversely affecting battery consumption.

SUMMARY OF THE INVENTION

In accordance with the principles of the present invention, a geofence method and technology that increases the probability of accurate entry/exit geofence triggers without additionally increasing the probability of inaccurate entry/exit geofence triggers, comprises a least squares geofence method. A least squares geofence method introduces inventive geofence steps and modifies existing geofence steps to minimize trigger misfires caused by data variability and location blunders and to minimize delayed/missed entry triggers generated under urban and/or indoor conditions. Inventive steps introduced in the least squares geofence method include: get trigger side fast, filter locations, calculate least squares location, and entering or exiting filter. Existing geofence steps modified in the inventive least squares geofence method include: wait until next fix time, enter slow fix mode, and get location.

In accordance with the principles of the present invention, the least squares geofence method uses a weighted least squares (LS) model to compute a location estimate for a target wireless device based on several sample location points retrieved for that particular device. A least squares (LS) location estimate is used to evaluate whether a target device is located inside or outside a predefined geofence.

In accordance with the principles of the present invention, a geofence method and technology that further increases the probability of accurate entry/exit geofence triggers without additionally increasing the probability of inaccurate entry/exit geofence triggers, comprises a Kalman filter geofence method. A Kalman filter geofence method uses an existing Kalman filter to filter sample location points retrieved for a target wireless device. Filtered location data is used to evaluate whether a target device is located inside or outside a predefined geofence. Inventive modules introduced in the Kalman filter geofence method include: a system model/estimation module, a data quality analysis module, a geofence crossing detection module, a next location time request module, and a trip profile estimation module.

In accordance with the principles of the present invention, the Kalman filter geofence method evaluates velocity and heading information for a target wireless device to enable accurate entry/exit geofence triggers to be generated for devices in motion.

In accordance with another aspect of the present invention, the Kalman filter geofence method dynamically determines a number of location fixes required to refine an initial judgement of geofence boundary crossing (i.e. initial geofence side condition) for a target wireless device. In addition, the Kalman filter geofence method dynamically determines time intervals to implement between individual location fixes retrieved for a target wireless device. Dynamically determining quantity of location fixes and length of time intervals implemented between location fixes retrieved for a target wireless device, helps to conserve the consumption of energy on that particular device.

BRIEF DESCRIPTION OF THE DRAWINGS

Features and advantages of the present invention become apparent to those skilled in the art from the following description with reference to the drawings:

FIG. 16 portrays a location log for an exemplary device that is stationary inside a geofence, in accordance with the principles of the present invention.

FIG. 17 portrays a location log for an exemplary wireless device that exits a new geofence and remains near the boundary of that geofence, in accordance with the principles of the present invention.

DETAILED DESCRIPTION OF ILLUSTRATIVE EMBODIMENTS

Figure 1:
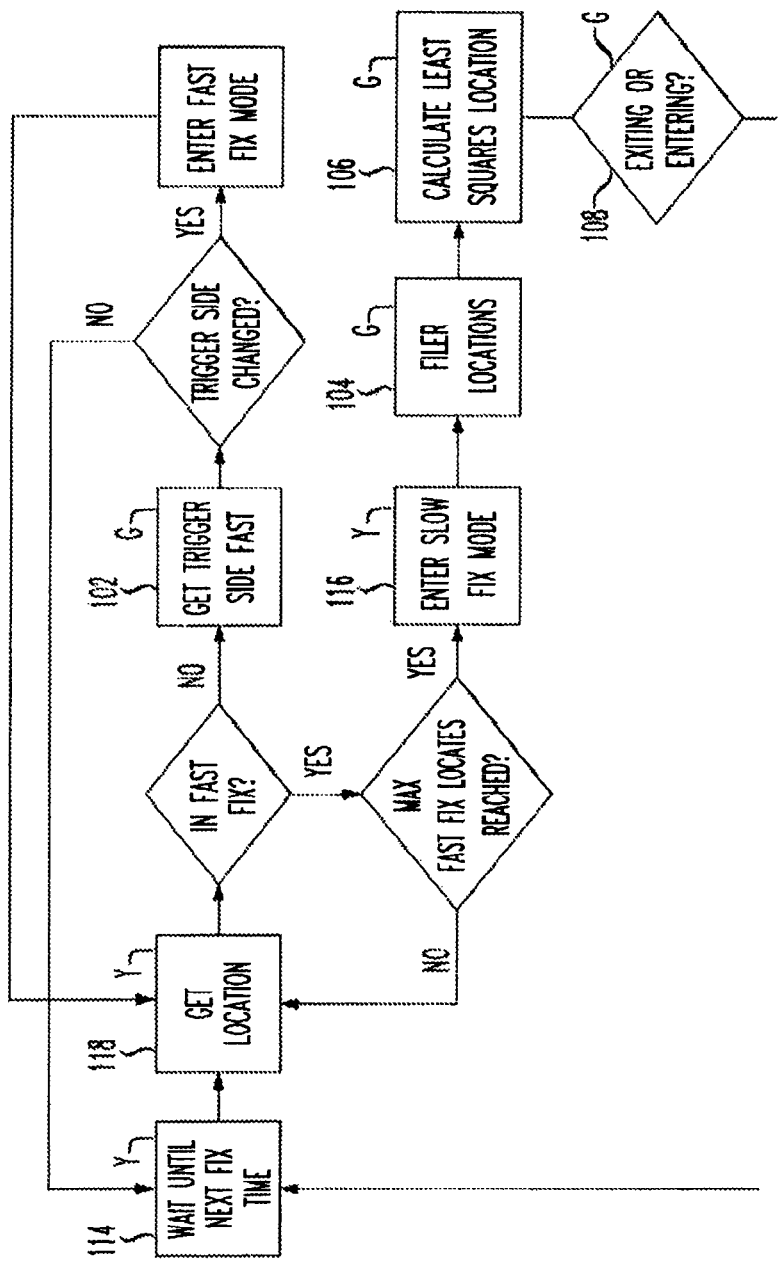
FIG. 1 depicts an exemplary least squares geofence method call flow, in accordance with the principles of the present invention.
Figure 1:
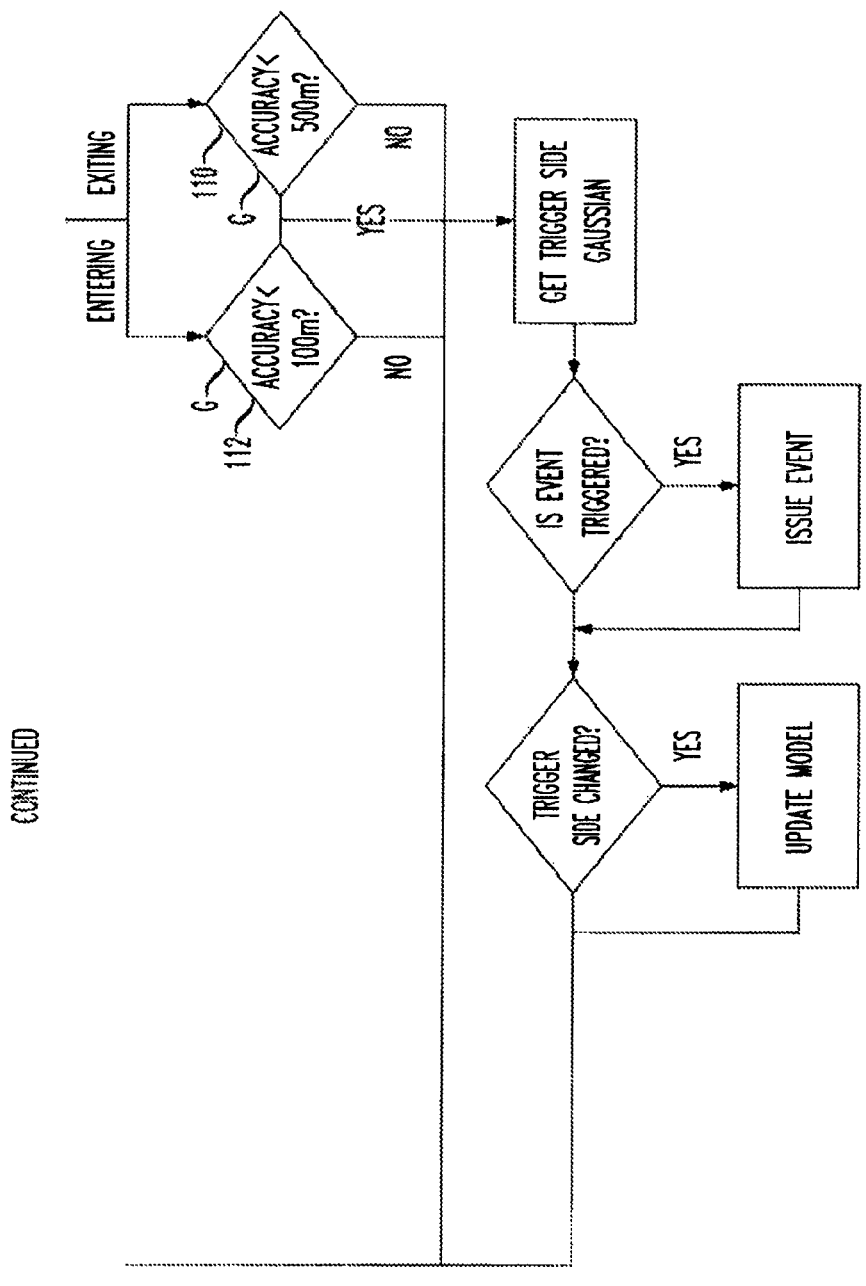

The present invention comprises a least squares geofence method and technology that utilizes as much data as possible to increase the probability of accurate entry/exit geofence triggers without additionally increasing the probability of inaccurate entry/exit geofence triggers. In particular, an inventive least squares geofence method alters an existing geofence method to address two major issues: delayed/missed entry triggers under urban and/or indoor conditions; and trigger misfires caused by data variability and location blunders.

In accordance with the principles of the present invention, the least squares geofence method comprises the following events: determining when and how to gather sample location points for a target wireless device; computing a location estimate for said target wireless device based on gathered sample location points; filtering said computed location estimate based on a current state (i.e. geofence side condition) of said target wireless device; and evaluating whether an event has been triggered.

In accordance with the principles of the present invention, the least squares geofence method analyzes location data retrieved for a target wireless device, to evaluate a geofence side condition for that particular device. If the value of a geofence side condition is 'inside' for a target wireless device, that device is currently located inside a predefined geofence. Likewise, if the value of a geofence side condition is 'outside' for a particular target device, that device is currently located outside a predefined geofence. An entry/exit geofence trigger is generated whenever a change in geofence side condition is detected for a target wireless device.

The present inventors have appreciated that controlling how often to obtain sample location points for a target wireless device, and determining an appropriate amount and type (e.g. GPS, network, cell, etc.) of sample location points to obtain, is key to generating accurate entry/exit geofence triggers.

The least squares geofence method disclosed herein assumes that useful information may be obtained from all data retrieved for a target wireless device. Moreover, the present invention assumes that the key to obtaining such useful information lies particularly in the manner in which data is extracted. For instance, a correlation of sample location points retrieved for a target wireless device may signify the accuracy of a resultant location estimate. For example, a location estimate that is computed based on a single sample location point may not yield much statistical confidence. Least squares utilizes the fact that if a series of location data is measured independently, the average of these location data is more reliable because errors are reduced by averaging due to the randomness of the errors.

To trigger a geofence reliably, location information for a target device must be determined with a high level of confidence. In accordance with the principles of the present invention, the least squares geofence method obtains enough sample location points to capture the true variability of a geographic position of a wireless device, without adversely affecting battery consumption.

The least squares geofence method disclosed herein implements statistical techniques to estimate a geographic location of a wireless device based on several sample location points. More particularly, the least squares geofence method uses a conventional weighted least squares (LS) model to compute a weighted best estimate of a geographic position of a wireless device. A conventional weighted least squares (LS) model is simplified within the context of the present invention to reduce computational intensity.

In addition, the present inventors have appreciated that filtering data at an appropriate time is yet another key to increasing accurate entry/exit geofence triggers without additionally increasing inaccurate entry/exit geofence triggers. Sample location points retrieved for a target wireless device are filtered prior to computing a location estimate for that particular target wireless device. Least squares (LS) location estimates are subsequently computed and filtered, in accordance with an anticipated trigger event.

The least squares geofence method must be careful to avoid false positives (i.e. false entry/exit triggers) caused by location blunders retrieved for a target wireless device. A blunder is a data point that does not contain any truth. Hence, a blunder is detrimental to a location estimate and therefore filtered by the least squares geofence method before a location estimate is computed.

To avoid computing a location estimate that contains/reflects location blunders, the present invention filters (i.e. rejects) locations with poor accuracies retrieved for a target wireless device. However, the least squares geofence method is also careful not to filter all locations retrieved for a target wireless device. For instance, a device exiting a geofence is often travelling, sometimes at high speeds. Being that sample data retrieved for a device in motion is not well correlated, the present invention cannot filter all locations with meager accuracies retrieved for a target wireless device. In accordance with the principles of the present invention, when a state of a target device is 'inside', the least squares geofence method filters all positions computed for that device with poor accuracies, and instead only evaluates positions computed for that device with medium accuracies.

The least squares geofence method only generates an entry trigger when a target device enters and remains inside a geofence. Consequently, the least squares geofence method assumes that movement of a target device inside a geofence is limited. In accordance with the principles of the present invention, when a state of a target device is 'outside', the least squares geofence method filters all positions computed for that device with poor and medium accuracies, and instead only evaluates positions computed for that device with high accuracies. Hence, the least squares geofence method applies a stricter filter to detect a geofence entry than it does to detect a geofence departure.

The least squares geofence method modifies a conventional geofence filtering technique, so that events may be triggered using indoor locates without provoking severe boundary issues. Moreover, to reduce geofence complexity and potential future issues, the present invention prefers to use general rules to filter a computed location estimate, as opposed to specific rules tailored to each use case.

In accordance with the principles of the present invention, the least squares geofence method comprises two particular cases of interest: exiting a geofence and entering a geofence. When a target device is inside the geographical confines of a geofence (i.e. the device's current state of nature is 'inside'), the only alternative available to that device is to exit. Likewise, when a target device is outside the geographical confines of a geofence (i.e. the device's current state of nature is "outside"), the only alternative available to that device is to enter. Further, in terms of entering, the present invention is only interested in the scenario in which a device enters and remains inside a geofence. Similarly, in terms of exiting, the present invention is only interested in the scenario in which a device exits and remains outside a geofence (i.e. when a device has truly exited a geofence). The least squares geofence method thoroughly analyzes location data retrieved for a target wireless device to evaluate whether an entry/exit event has been triggered.

In particular, the least squares geofence method uses techniques of the existing gaussian geofence to evaluate whether an entry/exit event has been triggered. However, instead of computing 3 separate geofence side conditions for a target wireless device, based on 3 separate sample location points (as performed in a conventional geofence method), the least squares geofence method computes only one geofence side condition for that target device, using a least squares (LS) location estimate based on several sample location points.

FIG. 1 depicts an exemplary least squares geofence method call flow, in accordance with the principles of the present invention.

As depicted in FIG. 1, new steps introduced in the least squares geofence method are designated 'G', and modifications made to existing steps in the existing geofence method are designated 'Y'. New steps G shown in FIG. 1 modify the manner in which location data is captured, filtered, and used in the existing geofence method.

In particular, get trigger side fast 102 is an inventive geofence step that uses a point in circle algorithm to evaluate whether a location retrieved for a target wireless device is inside a predefined geofence. In accordance with the principles of the present invention, get trigger side fast 102 returns an "outside", "boundary", or "inside" condition, according to an outcome produced by the point in circle algorithm. Get trigger side fast 102 does not take location accuracy in to account.

In accordance with the principles of the present invention, get trigger side fast 102 alerts the least squares geofence method to a potential change in geofence side condition for a specified target device, so that such a change may be investigated further through a fast fix cycle.

Table 1 shows criteria required to meet an "inside", "outside", and "boundary" condition returned by get trigger side fast 102.

TABLE 1

| Condition | Criteria |
|---|---|
| Inside | Distance/Radius < 80% |
| Outside | Distance/Radius > 120% |
| Boundary | Otherwise |

In particular, if a distance between a current location of a target wireless device and the center point (i.e. latitude and longitude of the center of a geofence) of a relevant geofence, divided by the radius of that relevant geofence is less than 80%, get trigger side fast returns an "inside" condition for that target wireless device. Moreover, if a distance between a current location of a target device and the center point (i.e. latitude and longitude of the center of a geofence) of a relevant geofence, divided by the radius of that relevant geofence is greater than 120%, get trigger side fast returns an "outside" condition for that target wireless device. Otherwise, get trigger side fast returns a "boundary" condition for that target wireless device.

Filter locations 104 is an inventive step that is introduced in the least squares geofence method to filter sample location points retrieved for a target wireless device. Filter locations 104 is implemented in the least squares geofence method before a location estimate is computed for a target wireless device.

A conventional least squares (LS) model relies on the assumption that the estimated accuracy realistically reflects the true accuracy of the location. However, the present inventors have recognized (through researching certain Long Term Evolution (LTE) devices) that the estimated accuracy of coarse location generated by Cell ID is too optimistic. In accordance with the principles of the present invention, filter locations 104 minimizes the effect of blunders and coarse locates on location estimates computed in the least squares geofence method.

Figure 2:
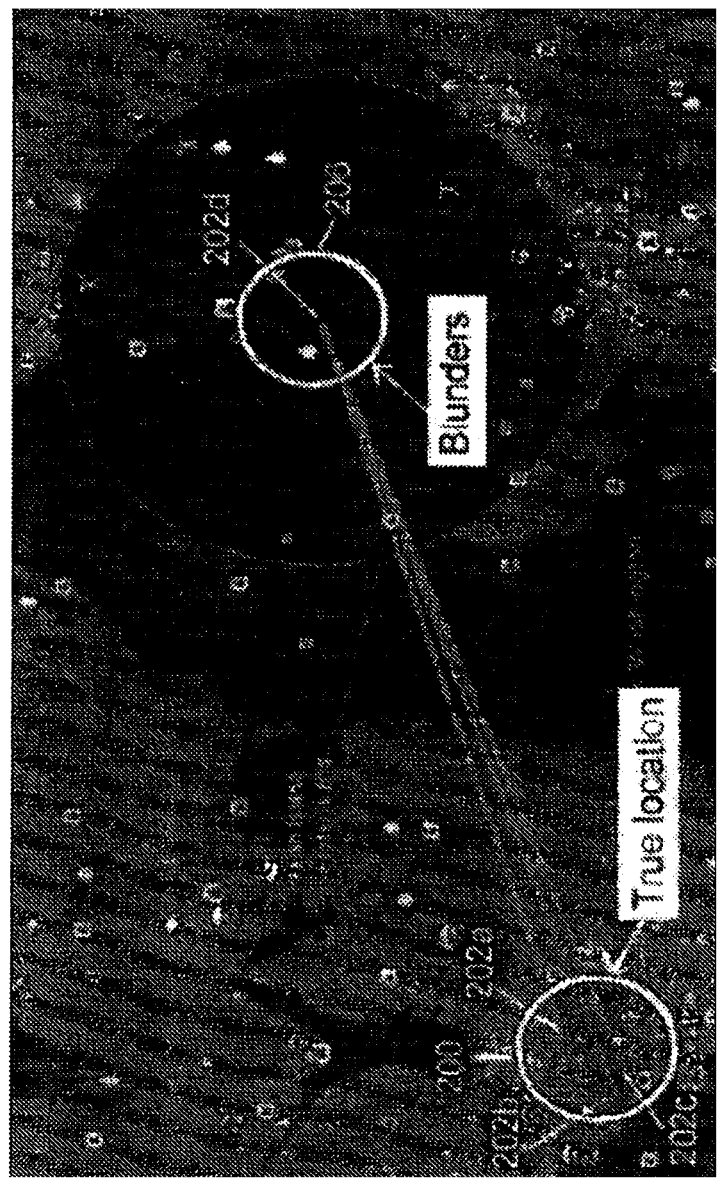
FIG. 2 depicts coarse locates retrieved for a given target device, in accordance with the principles of the present invention.

FIG. 2 depicts coarse locates retrieved for a target wireless device, in accordance with the principles of the present invention.

In particular, FIG. 2 depicts a set of sample location points 202 retrieved for a wireless device that is stationary at a Seattle office 200. However, as depicted in FIG. 2, sample location points 202 retrieved for the stationary wireless device periodically jump across Lake Washington 204. Although the accuracy of coarse locates 206 retrieved for the stationary wireless device is approximately 1.5 km, the true error of coarse locates 206 is actually over 11 km. Hence, course locates 206 depicted in FIG. 2 are better considered blunders as opposed to valid data.

Filter locations 104 minimizes the effect of coarse locates on location estimates computed via the least squares geofence method. In particular, before a location estimate is computed for a target wireless device, filter locations 104 filters sample location points (i.e. location inputs) retrieved for that device with accuracies greater than 1 km. Hence, locations having accuracies greater than 1 km are not used to compute location estimates in the inventive least squares geofence method.

Calculate least squares location 106 is yet another inventive step introduced in the least squares geofence method. Calculate least squares location 106 calculates a location estimate for a target wireless device using a conventional weighted least squares (LS) model. A conventional weighted least squares (LS) model naturally places more emphasis on good quality data and less emphasis on poor quality data retrieved for a target wireless device.

Figure 3:
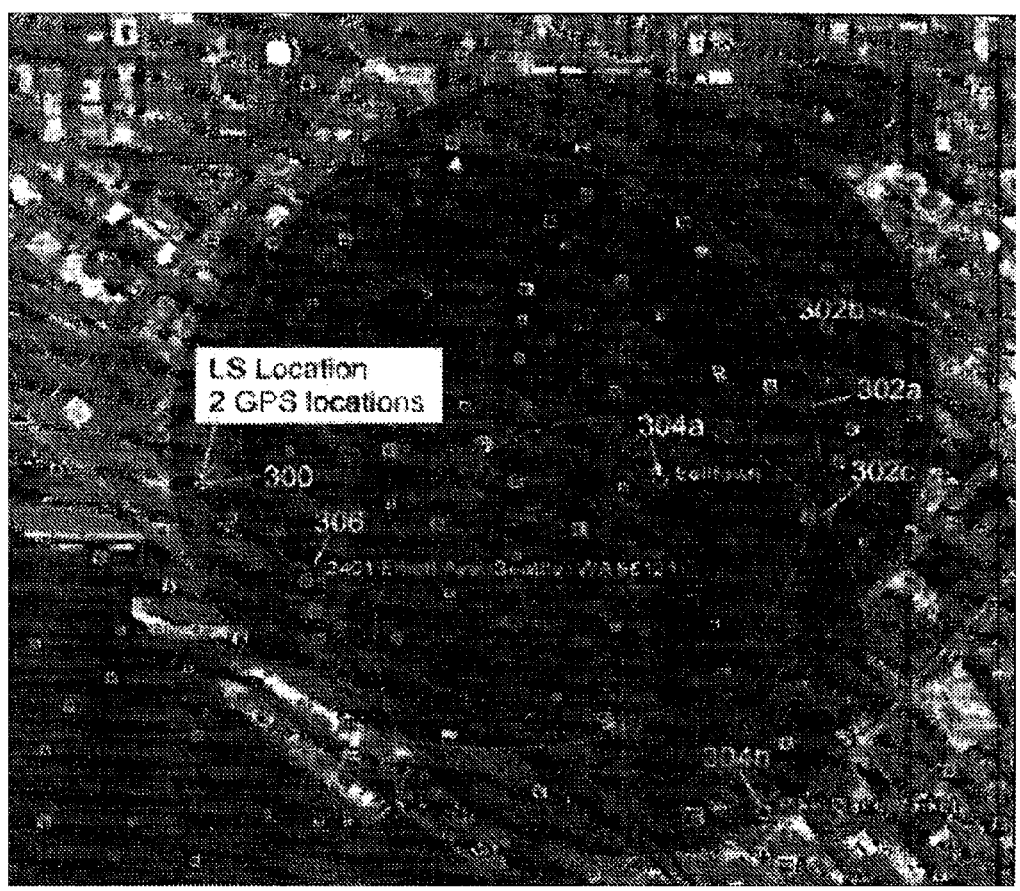
FIG. 3 depicts a weighted least squares (LS) location estimate computed for a target wireless device, in accordance with the principles of the present invention.

FIG. 3 depicts an exemplary weighted least squares (LS) location estimate computed for a target wireless device, in accordance with the principles of the present invention.

In particular, FIG. 3 depicts a weighted least squares (LS) location estimate 300 computed using 3 network locates 302 and 2 GPS locates 304 retrieved for a target wireless device 306. As depicted in FIG. 3, when computing the weighted least squares (LS) location estimate 300, the weighted least squares model naturally gravitates toward the 2 GPS locates 304 retrieved for the target device and naturally de-weights the 3 network locates 302.

In accordance with the principles of the present invention, filter locations 104 is the only filter that is required at the data input level of the least squares geofence method, due to use of a weighted least squares (LS) model to compute location estimates.

In accordance with the principles of the present invention, calculate least squares location 106 calculates a weighted least squares (LS) location estimate for a target wireless device based on sample location points retrieved for that device in a conventional fast fix cycle. At least 2 valid sample location points are required to compute a least squares (LS) location estimate for a target wireless device. The weighted least squares (LS) model used within the inventive least squares geofence method assumes that all sample location points retrieved for a target wireless device, describe a true location.

The parametric least squares (LS) model employed in the least squares geofence method is described by the following equations:

$F(x_i) = x_0, F(y_i) = y_0;$ $\hat{x} = x_0 + \hat{\delta}$

Where, $X_0 = \begin{bmatrix} x_0 \\ y_0 \end{bmatrix} = \begin{bmatrix} 0 \\ 0 \end{bmatrix}$ (set initial estimates equal to zero)

$\hat{\delta} = -(N)^{-1} u$ $N = A^T P A$ $u = A^T P w$ $A = \begin{bmatrix} \frac{\partial F(x_i)}{\partial x} & \frac{\partial F(x_i)}{\partial y} \\ \frac{\partial F(y_i)}{\partial x} & \frac{\partial F(y_i)}{\partial y} \\ \vdots & \vdots \end{bmatrix} = \begin{bmatrix} 1 & 0 \\ 0 & 1 \\ \vdots & \vdots \end{bmatrix}$ $P = C_l^{-1} = \begin{bmatrix} \sigma_{x_1}^2 & \sigma_{x_1 y_1} & 0 \\ \sigma_{x_1 y_1} & \sigma_{y_1}^2 & 0 \\ 0 & 0 & \ddots \end{bmatrix}^{-1}$ $w = X_0 - \begin{bmatrix} x_1 \\ y_1 \\ \vdots \end{bmatrix} = -\begin{bmatrix} x_1 \\ y_1 \\ \vdots \end{bmatrix}$ $C_{\hat{x}} = \hat{\sigma}_0^2 N^{-1}$ Where, $\hat{\sigma}_0^2 = \frac{\hat{v}^T P \hat{v}}{n - u}$ $\hat{v} = A\hat{\delta} + w$ n=number of observations u=number of unknowns However, the present invention simplifies the previous process by eliminating the covariance between $x_n$ and $y_n$ and setting the variance of $x_n$ and $y_n$, equal. Simplification of the least squares (LS) fit calculation results in the following equations:

$N = \begin{bmatrix} N_x & 0 \\ 0 & N_y \end{bmatrix}$

Where, $N_x = N_y = \frac{1}{\sigma_1^2} + \frac{1}{\sigma_2^2} + \ldots + \frac{1}{\sigma_n^2}$ (Compute)

$U = -\begin{bmatrix} u_x \\ u_y \end{bmatrix}$

Where, $u_x = \frac{x_1}{\sigma_1^2} + \frac{x_2}{\sigma_2^2} + \ldots + \frac{x_n}{\sigma_n^2}$ (Compute)

$u_y = \frac{y_1}{\sigma_1^2} + \frac{y_2}{\sigma_2^2} + \ldots + \frac{y_n}{\sigma_n^2}$ (Compute)

$\hat{\sigma}_0^2 = \frac{(x_1 - \hat{x})^2 + (y_1 - \hat{y})^2}{\sigma_1^2} + \frac{(x_2 - \hat{x})^2 + (y_2 - \hat{y})^2}{\sigma_2^2} + \ldots + \frac{(x_n - \hat{x})^2 + (y_n - \hat{y})^2}{\sigma_n^2} \bigg/ (n - u)$ (Compute)

Solving for the unknowns results in the following:

$\hat{x} = N_x^{-1} u_x$ $\hat{y} = N_y^{-1} u_y$ $C_{\hat{x}} = C_{\hat{y}} = \hat{\sigma}_0^2 N_x^{-1}$ The previous solution simplifies a least squares (LS) fit calculation so that matrix inversions, multiplications, and additions are not required.

Table 2 shows operations required to perform steps in a least squares (LS) fit calculation implemented by the least squares geofence method, in accordance with the principles of the present invention.

TABLE 2

| Step | Operations |
| --- | --- |
| Compute $\frac{1}{\sigma_n^2}$ | N multiplications, N divisions |
| Compute $N_x$ | N additions |
| Compute $u_x$ | N multiplications, N additions |
| Compute $u_y$ | N multiplications, N additions |
| Compute $\sigma_0^2$ | 2N subtractions, 2N additions, 3N multiplications, 1 division |

As depicted in Table 2, steps performed in a simplified least squares (LS) fit calculation do not contain operations involving costly square roots or trigonometric functions.

An inventive entering or exiting filter 108 is yet another step introduced in the least squares geofence method. An entering or exiting filter 108 is implemented in the least squares geofence method following computation of a least squares (LS) location estimate for a specified target device. Once step calculate least squares location has computed a least squares (LS) location estimate for a given target device, that location estimate is subsequently filtered by the entering or exiting filter 108 in accordance with an anticipated trigger event (i.e. whether a device is potentially entering or exiting a geofence). For instance, if method get trigger side fast 104 previously returned a state of 'inside' for a target device, but is now returning a state of 'outside', that target device may potentially be exiting a geofence. When a target device is potentially exiting a geofence, the least squares geofence method uses a loose exiting filter (500 m) 110 to filter a least squares (LS) location estimate computed for that device. Alternatively, when the current state of a target device is not 'inside', that target device may potentially enter a geofence at any given time. When a device is potentially entering a geofence, the least squares geofence method uses a tighter entering filter (100 m) 112 to filter a least squares (LS) location estimate computed for that particular device (to minimize the probability of false entry triggers).

Accuracy of a least squares (LS) location estimate is based on weighted residuals of a least squares (LS) model used to compute that location estimate. The least squares (LS) model used within the present invention assumes that all input locations retrieved for a given target device, describe the same location. Moreover, a small variance computed via the least squares (LS) model indicates that input locations are tightly correlated and the model is a good fit.

In accordance with the principles of the present invention, the least squares geofence method assumes that a device located inside a geofence is relatively stationary and points retrieved for that device via a fast fix cycle are tightly correlated. Consequently, sample location points having poor individual quality (>300 m) are able to yield a computed location estimate that is good quality (<100 m). This assumption permits the least squares geofence method to use even cell locates with large errors in a geofence calculation, because sample location points that are well-correlated yield a location estimate computed with high confidence. Input accuracies are not important to the least squares (LS) model employed by the least squares geofence method. Rather, input accuracies are only used to weigh inputs to a least squares (LS) model. Moreover, the fit of location data computed via a least squares (LS) model is used to develop an accuracy proclamation for a corresponding location estimate, in accordance with the principles of the present invention.

Figure 4:
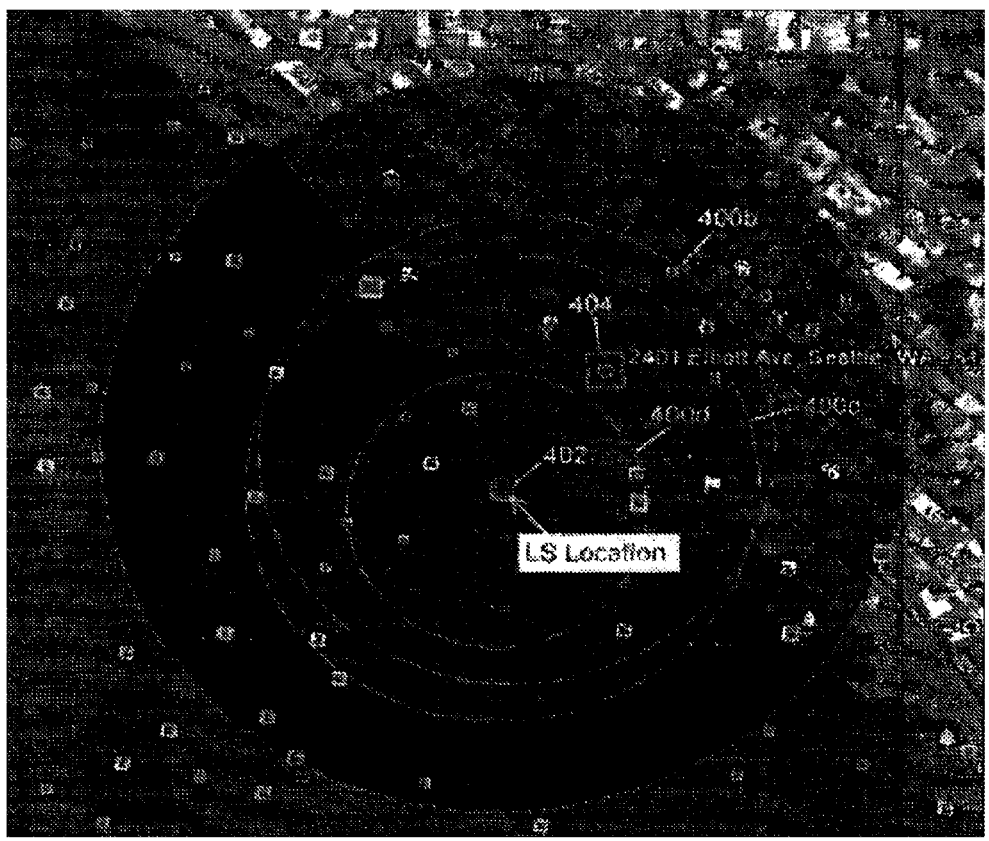
FIG. 4 depicts network locates used to compute a location estimate for a target wireless device, in accordance with the principles of the present invention.

FIG. 4 depicts network locates used to compute a location estimate for a target wireless device, in accordance with the principles of the present invention.

In particular, 4 network locates 400 with accuracies between 250 m and 700 m are used to compute a least squares (LS) location estimate 402 for a target wireless device 404, as depicted in FIG. 4. Since network locates 400 shown in FIG. 4 are tightly correlated, the resultant location estimate 402 has an accuracy of less than 25 m.

A large variance indicates to the least squares geofence method that sample location points retrieved for a target wireless device are likely not describing the same location. Yet, although some sample location points are likely blunders when points retrieved for a target device yield an extremely poor fit, the least squares geofence method may not immediately conclude that such points are blunders because a device in motion is also likely to produce a model with poor fit.

Figure 5:
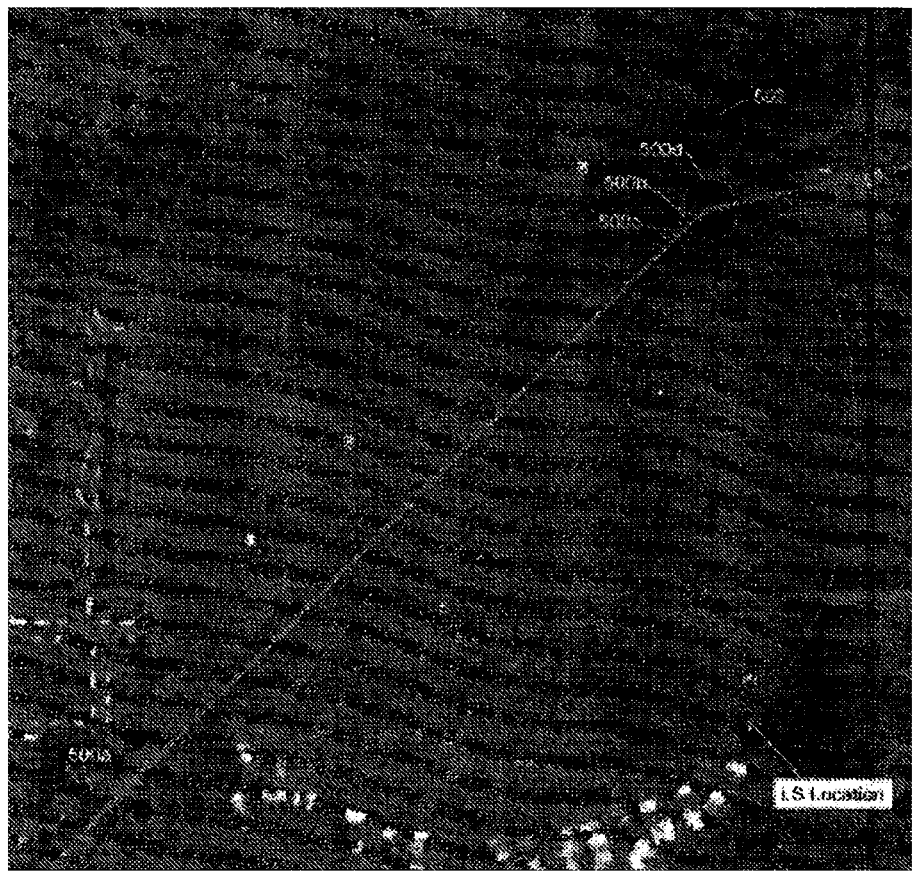
FIG. 5 depicts exemplary GPS locates retrieved for a device in motion, in accordance with the principles of the present invention.

FIG. 5 depicts exemplary GPS locates retrieved for a device in motion, in accordance with the principles of the present invention.

For instance, FIG. 5 shows a least squares (LS) location estimate 502 computed based on 5 GPS locates 500 (4 of which are depicted in FIG. 5) retrieved for a device in motion. GPS locates 500 used to compute the least squares (LS) location estimate 502 depicted in FIG. 5 have individual accuracies of less than 60 m. However, the least squares (LS) location estimate 502 depicted in FIG. 5 yields an accuracy of approximately 350 m. To account for devices in motion, the least squares geofence method uses a loose filter to filter out blunders, while still allowing reasonable motion within the system.

Factors such as GPS drift, multipath, biases, atmospheric effects, and cell tower hopping can cause location accuracies to be poorer than actual. For instance, multipath in an urban environment can introduce a systematic error in GPS positions that is not accounted for in reported accuracies. Although a least squares (LS) geofence solution can produce an extremely accurate location estimate, the present invention accounts for unknown factors by limiting a least squares (LS) fit accuracy to 100 m. Limiting the least squares (LS) fit accuracy reduces boundary effects under unknown circumstances.

In addition to introducing new steps to the existing geofence method, the present invention additionally modifies existing geofence steps, to simplify the conventional geofence process and reduce any potential errors. Modifications made to existing geofence steps are labeled 'Y' in FIG. 1.

In particular, existing geofence step wait until next fix time 114 is slightly modified from its original form, in accordance with the principles of the present invention. Step wait until next fix time 114 calculates a next fix time for a target device and is simplified within the present invention to only take location position into account and not location accuracy.

Table 3 depicts a calculated next fix time for individual fix modes and related conditions, in accordance with the principles of the present invention.

TABLE 3

| Condition | Next Fix Time |
| --- | --- |
| Fast Fix Mode | 1 second |
| Slow Fix Mode: Distance <= 3 Miles | 3 minutes |
| Slow Fix Mode: Distance > 3 Miles | Distance/60 mph |

In particular, Table 3 depicts time allotted between individual location retrievals for different fix modes implemented in the least squares geofence method. A point in circle trigger side check is only performed in slow fix mode in the least squares geofence method, so accuracy at this level is not that important and added complexity is not required.

Enter slow fix mode 116 is another conventional geofence step modified within the present invention. An existing enter slow fix mode 116 switches back to a slow fix mode (from a fast fix mode) after 3 consecutive same side conditions or 3 boundary conditions (whichever comes first). Theoretically, the existing enter slow fix mode 116 may result in a maximum of 4 additional fast fixes for a given target device. However, inventive modifications to enter slow fix mode 116 permit the least squares geofence method to get 4 additional fast fixes, without evaluating a geofence side condition (i.e. trigger side) after each fix. Rather, the inventive enter slow fix mode 116 switches back to a slow fix mode from a fast fix mode after it attempts to get 4 additional fast fixes (regardless as to whether fast fixes are successful or not). In accordance with the principles of the present invention, rather than evaluating 3 individual geofence side conditions based on 3 individual sample location points retrieved for a target device, the inventive enter slow fix mode 116 evaluates a single geofence side condition (i.e. trigger side) using a least squares location estimate based on 5 collective sample location points retrieved for a target device.

Get location 118 is yet another step modified in the present invention. Modifications implemented within the least squares geofence method enable step get location 118 to acquire a larger number of medium quality data points (i.e. sample location points) for a target device in a shorter period of time. In accordance with the principles of the present invention, a larger number of data points (i.e. sample location points) of medium quality are more valuable to the least squares geofence method, than a small number of data points of better quality.

Table 4 depicts locate timeouts performed via an existing get location step.

TABLE 4

| Fix Mode | Occurrence | Fix Type | Timeouts |
|---|---|---|---|
| Slow Fix | At most every 10 minutes | Optimal Fix | 45 s GPS, 45 s Network |
| Slow Fix | At most every 3 minutes | GPS Fix | 45 s GPS |
| Fast Fix | At least 2 additional locates, at most 4 additional locates | Optimal Fix | 45 s GPS, 45 s Network |

In particular, Table 4 depicts fix occurrence, fix types, and locate timeouts implemented by an existing get location step 118, for individual fix modes implemented in the existing geofence method.

In accordance with the principles of the present invention, conventional 3 data point samples do not adequately represent the full variability of location data retrieved for a target wireless device. Rather, 3 data point samples result in data with high variability and consequently yield numerous geofence misfires when used to compute location estimates in the inventive least squares (LS) geofence method.

Figure 6:
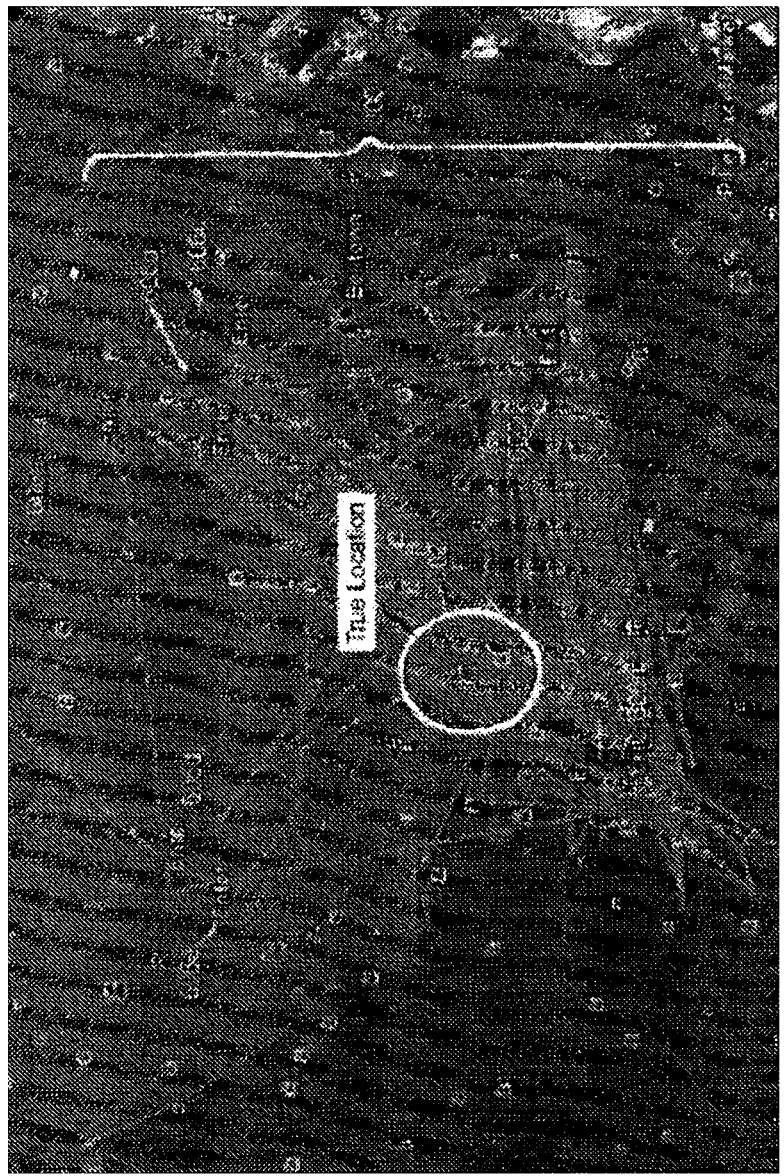
FIG. 6 depicts error circles for a series of indoor locates retrieved for a target wireless device, in accordance with the principles of the present invention.

FIG. 6 depicts exemplary trigger misfires generated when location estimates are computed using 3 data point samples retrieved for a target wireless device, in accordance with the principles of the present invention.

In particular, FIG. 6 portrays location information 600 for a target device 602 that passes through a northern geofence and afterwards remains on the boundary of that northern geofence, located well within a southern geofence. FIG. 6 additionally depicts least squares (LS) location estimates 604 computed using 3 data point samples retrieved for that target wireless device 602. As depicted in FIG. 6 location estimates computed using 3 data point samples inaccurately depict the device 602 jumping in and out of the northern geofence, hence provoking numerous trigger misfires 606.

Least squares (LS) location estimates computed using a series of sample location points retrieved for a target wireless device are more accurate than least squares (LS) location estimates computed using 3 data point samples.

Figure 7:
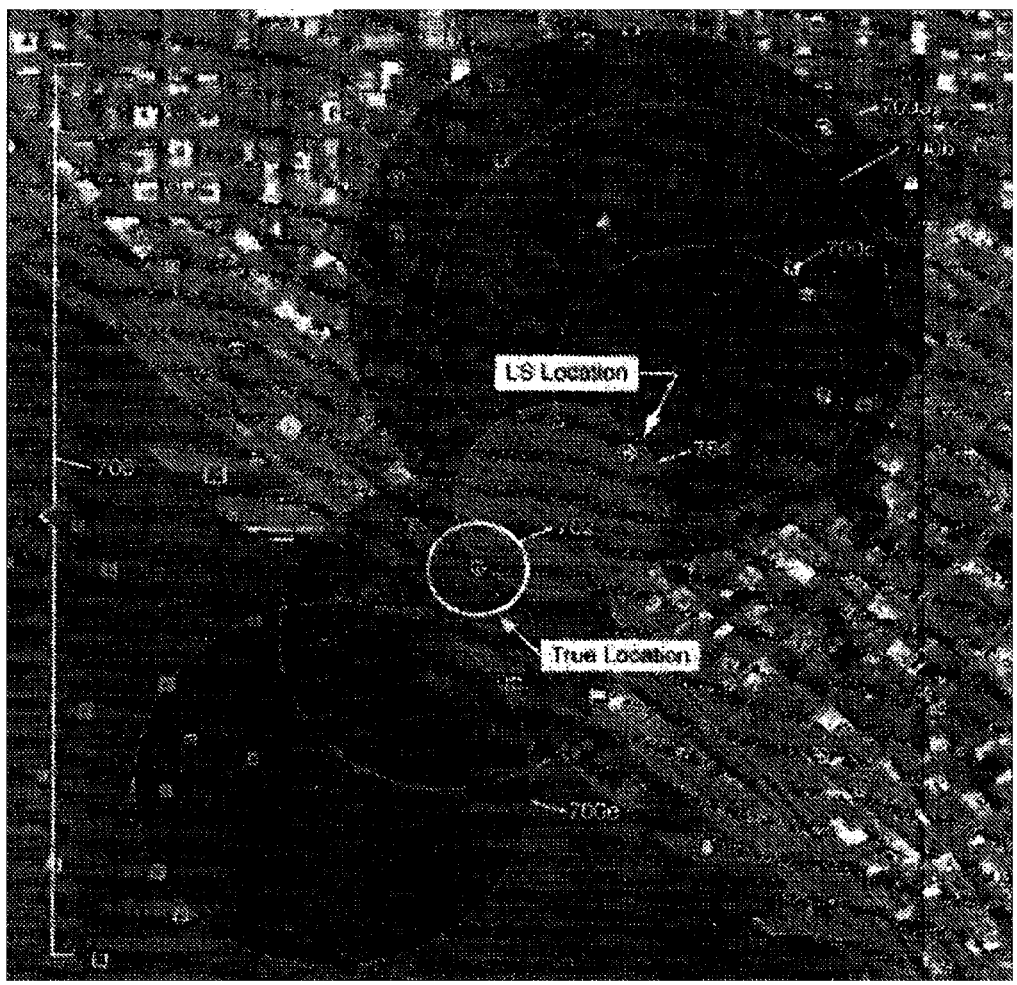
FIG. 7 depicts exemplary trigger misfires generated when only 3 sample location points are used to calculate location estimates for a target wireless device, in accordance with the principles of the present invention.

FIG. 7 depicts error circles for a series of indoor locates retrieved for a target wireless device, in accordance with the principles of the present invention.

In particular, error circles 700 depicted in FIG. 7 indicate that even when accuracies for individual locations 700 are poor, a least squares (LS) location estimate 704 computed using a series of locations 706 may provide a good indication of a device's true location 702.

The number of trigger misfires generated by the least squares geofence method significantly decreases when least squares location estimates are computed using 5 sample location points.

Figure 8:
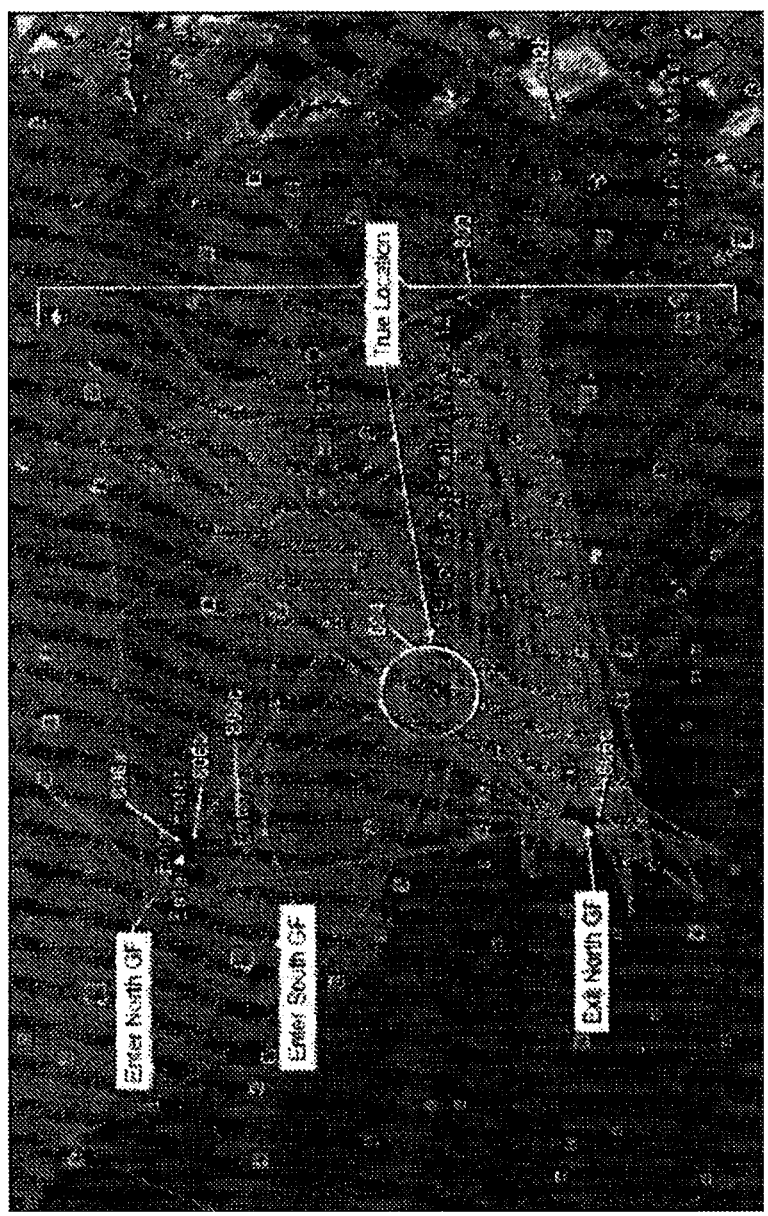
FIG. 8 depicts exemplary geofence triggers generated when a location estimate is computed using 5 sample location points retrieved for a target wireless device, in accordance with the principles of the present invention.

FIG. 8 depicts exemplary geofence triggers generated when a location estimate is computed using 5 sample location points retrieved for a target wireless device, in accordance with the principles of the present invention.

In particular, FIG. 8 depicts location information 800 and least squares (LS) location estimates 802 computed using 5 sample location points (i.e. 5 sample location points) retrieved for a target wireless device 804. A comparison of FIG. 8 to FIG. 6 (i.e., FIG. 6 portrays location estimates computed using 3 sample location points) shows that fewer trigger misfires 806 are generated when location estimates 802 are computed using a 5 data point sample as opposed to a 3 data point sample.

However, retrieving 5 sample location points using the existing get location 118 step results in a maximum delay of 7.5 minutes under indoor conditions. Consequently, the least squares geofence method modifies the existing get location 118 step to use a 15 second GPS locate timeout during a fast fix cycle as opposed to a conventional 45 second GPS locate timeout. Modifications to the existing get location 118 step enable a larger number of medium quality data points (i.e. sample location points) to be acquired in a shorter period of time.

Table 5 depicts locate timeouts performed via a modified get location 118 step, in accordance with the principles of the present invention.

TABLE 5

| Fix Mode | O0ccurrence | Fix Type | Timeouts |
|---|---|---|---|
| Slow Fix | At most every 3 minutes | Optimal Fix | 45 ms GPS, 45 s Network |
| Fast Fix | 4 additional locates | Optimal Fix | 15 s GPS, 45 s Network |

In particular, Table 5 depicts GPS locate timeouts and corresponding fix types used with different fix modes in the get location 118 step modified within the present invention. In addition, Table 5 articulates time allotted between individual location fixes for individual fix modes implemented within the inventive least squares geofence method.

To compare inventive and existing geofence performance, the least squares geofence method was implemented on Android™ devices using FLHybrid without a combo location provider. SCG preload build 62 was used as a baseline for the existing geofence method. FLHybrid and SCG were both loaded on the same devices with identical geofences set up on both platforms to guarantee identical testing conditions.

The least squares geofence method was additionally implemented on Research in Motion (RIM™) devices using FLA and compared with the existing geofence method. Simultaneous testing was performed using two separate devices carried by the same tester. However, comparative testing implemented on RIM™ devices was performed using different phone models, thereby affecting the availability and quality of location data.

In accordance with the principles of the present invention, the least squares geofence method generates entry/exit geofence triggers within a reasonable amount of time and distance for devices located in urban or indoor environments.

For example, an Android™ device was placed outside a geofence, turned OFF and subsequently turned back ON inside the geofence at an indoor location with no GPS access. Once the device was turned back on (inside the geofence), the least squares geofence method initiated a fast fix cycle immediately after acquiring a first indoor locate. After 5 successful indoor locates, the least squares geofence method computed a least squares (LS) location estimate for the Android™ device and generated an appropriate entry event.

After ensuring that the least squares geofence method was provided enough time to acquire several successful indoor locates, the Android™ device was turned OFF and subsequently turned back ON outside the geofence, at an indoor location with no GPS access. The least squares geofence method then initiated a fast fix cycle immediately after acquiring a first indoor locate. After 5 successful indoor locates, the least squares geofence method computed a least squares (LS) location estimate for the Android™ device and generated an appropriate exit event.

Figure 9:
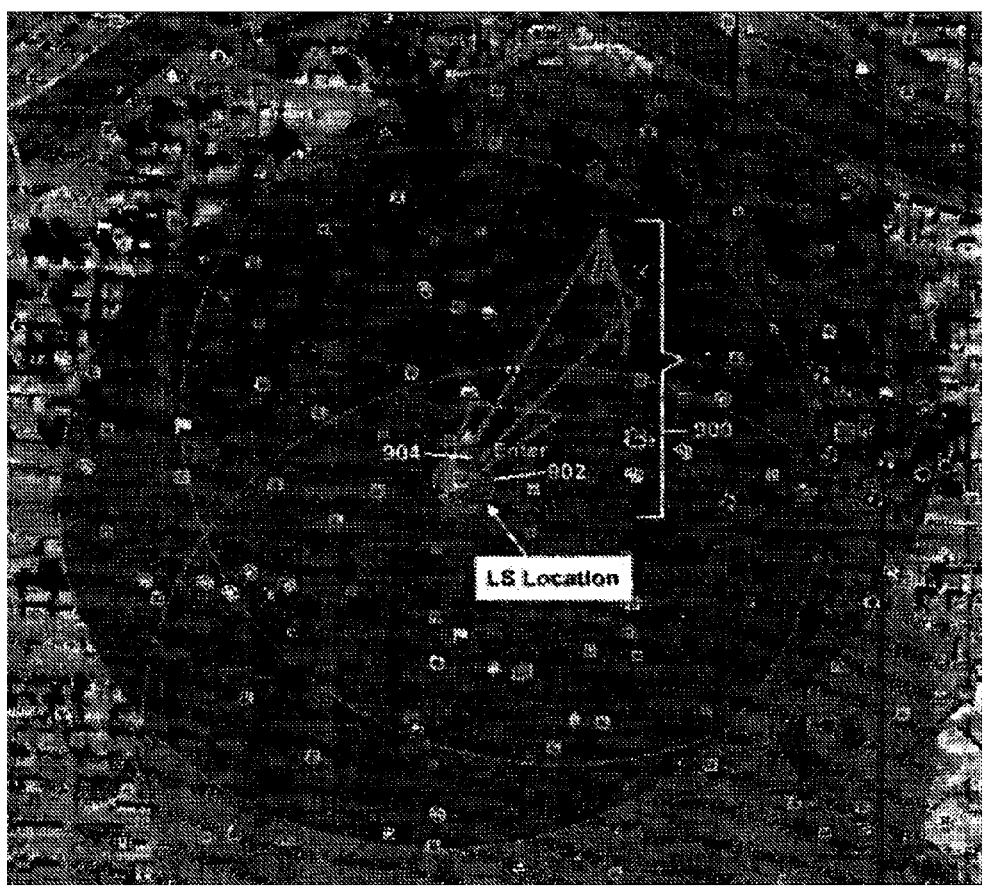
FIG. 9 depicts indoor locates retrieved for a target device entering a predefined geofence, in accordance with the principles of the present invention.

FIG. 9 depicts an exemplary entry event triggered by the least squares geofence method based on indoor locates retrieved for a target wireless device, in accordance with the principles of the present invention.

In particular, FIG. 9 depicts location information 900 for a device that was placed outside a geofence, turned OFF and subsequently turned back ON inside the geofence at an indoor location with no GPS access. Moreover, FIG. 9 depicts an appropriate entry event 904 generated by the least squares geofence method, based on a least squares (LS) location estimate 902 computed using 5 successful indoor locates retrieved for the target wireless device.

Figure 10:
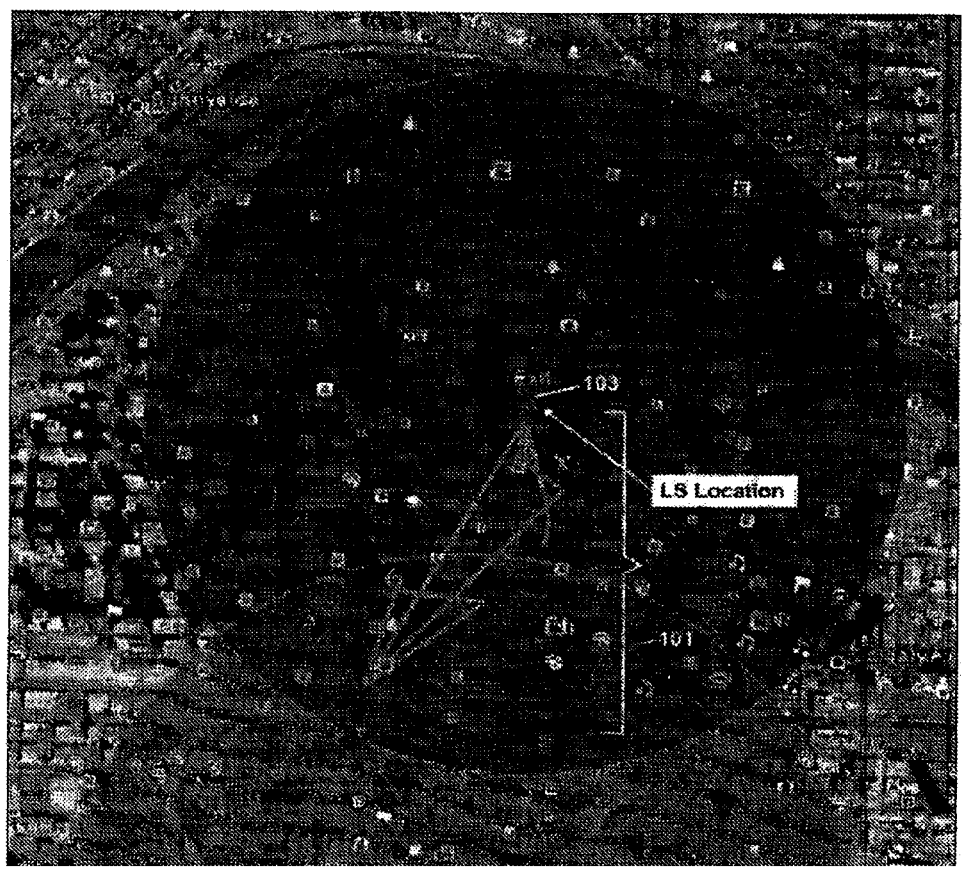
FIG. 10 depicts indoor locates retrieved for a target device exiting a geofence, in accordance with the principles of the present invention.

FIG. 10 depicts an exemplary exit event triggered by the least squares geofence method based on indoor locates retrieved for a target wireless device, in accordance with the principles of the present invention.

In particular, FIG. 10 depicts location information 101 for a device that was turned OFF inside a geofence and subsequently turned back ON outside a geofence at an indoor location with no GPS access. Furthermore, FIG. 10 additionally depicts an appropriate exit event 103 generated by the least squares geofence method following 5 successful indoor locates retrieved for the target wireless device.

However, unlike the least squares geofence method, the existing geofence method was not able to trigger an entry event nor an exit event for indoor locates depicted in FIGS. 9 and 10.

Figure 11:
FIG. 11 depicts indoor locates retrieved for a target wireless device via the existing geofence method.

FIG. 11 depicts exemplary trigger misfires experienced by the existing geofence method for a target device located in an indoor environment.

In particular, FIG. 11 depicts location information 111 for a target device that was placed outside a geofence, turned OFF, and subsequently turned back ON inside the geofence, at an indoor location with no GPS access. However, as depicted in FIG. 11, the existing geofence method was not able to trigger an entry event nor an exit event based on location information retrieved for the target wireless device.

In accordance with the principles of the present invention, the least squares geofence method does not generate trigger misfires for devices that straddle a geofence boundary for an extended period of time.

Figure 12:
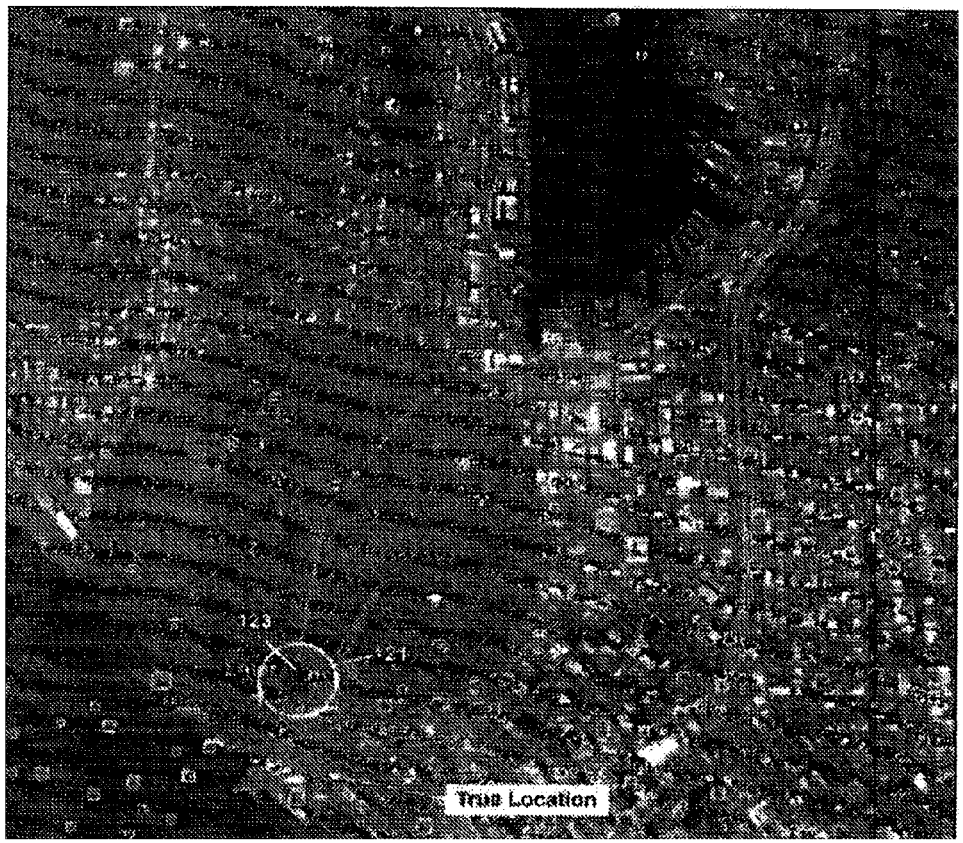
FIG. 12 depicts location information for a device straddling a geofence boundary for a prolonged period of time, in accordance with the principles of the present invention.

FIG. 12 portrays an entry trigger generated for a device straddling a geofence boundary for a prolonged period of time, in accordance with the principles of the present invention.

As depicted in FIG. 12, a target device resides on a boundary of a geofence (i.e. outside a geofence) 121, with several locations for that particular target device reported inside the geofence. However, no entry triggers are generated by the least squares geofence method until the device physically enters the geofence and passes through it. Hence, an entry event 123 is only triggered for the target wireless device when the least squares geofence method has sufficient confidence that the device has indeed entered the geofence. As depicted in FIG. 12, the least squares geofence method is able to capture true variability in data retrieved for a target wireless device.

Figure 13:
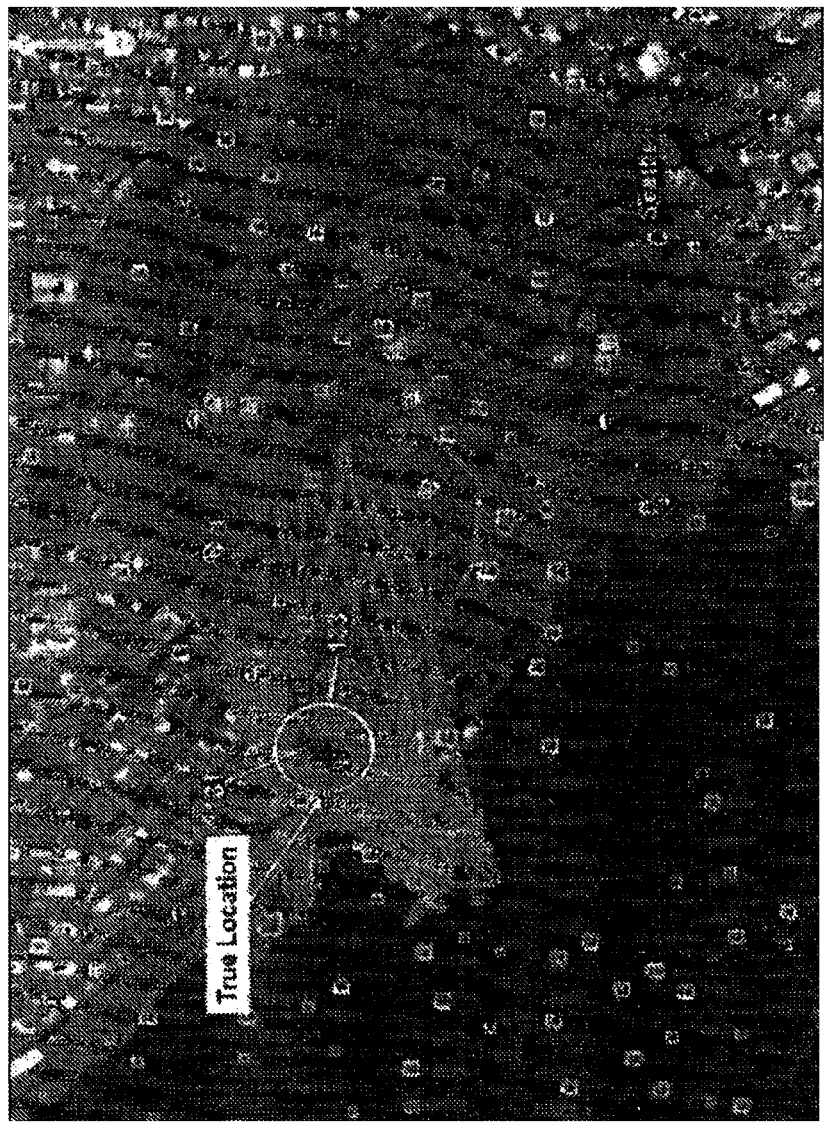
FIG. 13 portrays an exit trigger generated for a device straddling a geofence boundary for a prolonged period of time, in accordance with the principles of the present invention.

FIG. 13 portrays an exit trigger generated for a device straddling a geofence boundary for a prolonged period of time, in accordance with the principles of the present invention.

As shown in FIG. 13, a target device exits a geofence then resides near the boundary 133 of that geofence, with several locations for that particular target device reported inside the geofence. As depicted in FIG. 13, the least squares geofence method generates an exit trigger 131 for the target device immediately after the device exits the geofence. No subsequent re-entries are triggered.

In accordance with the principles of the present invention, the least squares geofence method performs on par with the existing geofence method in outdoor, high GPS environments.

Figure 14A:
FIGS. 14A through 14C depict exemplary geofence events triggered by both the least squares geofence method and the existing geofence method based on outdoor locates retrieved for a target wireless device, in accordance with the principles of the present invention.
Figure 14B:
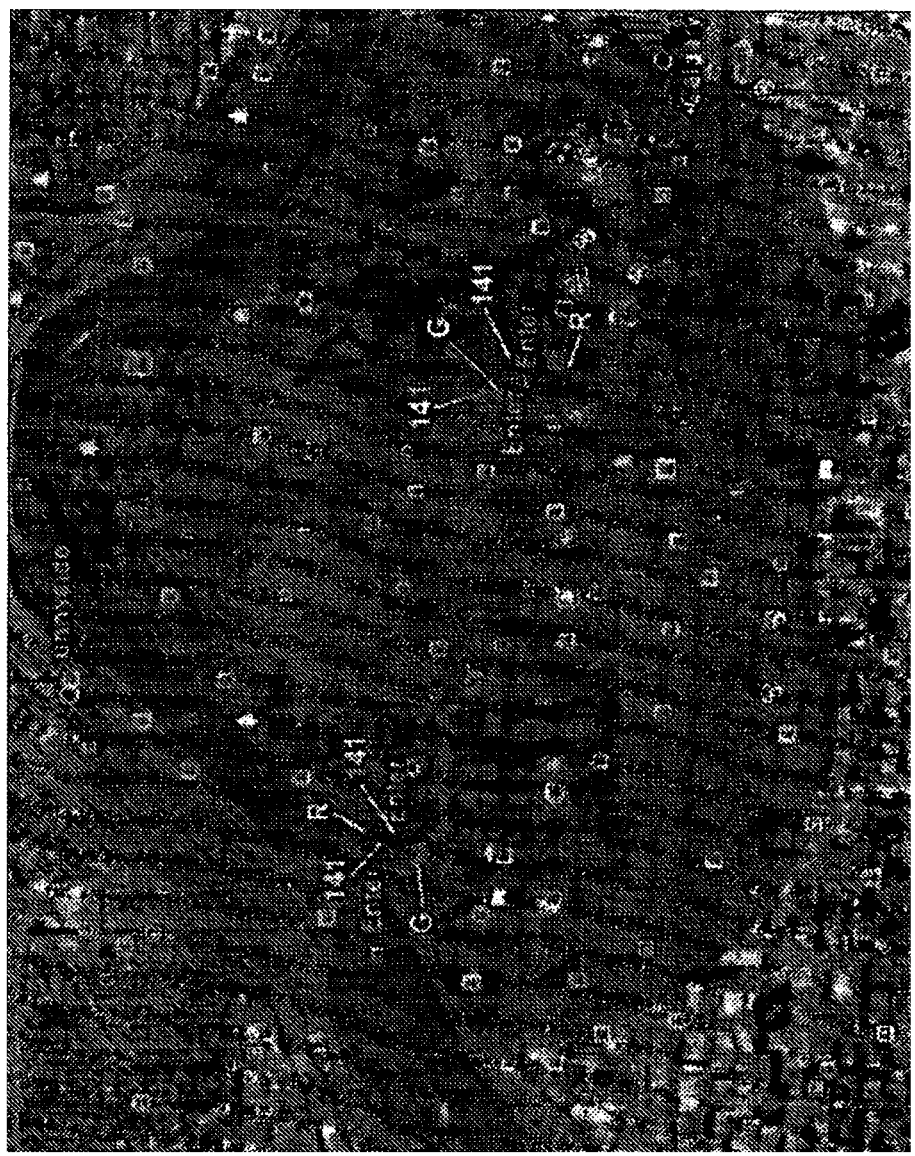
Figure 14C:

FIGS. 14A through 14C depict exemplary geofence events triggered by the least squares geofence method and the existing geofence method based on outdoor locates retrieved for a target wireless device, in accordance with the principles of the present invention.

In particular, pins labeled 'G' in FIGS. 14A through 14C indicate location of events 141 triggered by the least squares geofence method. Pins labeled 'R' in FIGS. 14A through 14C, indicate location of events 141 triggered by the existing geofence method. As depicted in FIGS. 14A through 14C, appropriate geofence events 141 are triggered by both the least squares geofence method and the existing geofence method for devices located in outdoor, high GPS environments. However, the least squares geofence method is able to issue exit events earlier than the conventional geofence method for devices located in urban environments.

FIG. 14C depicts exit events 141 generated by the least squares geofence method and the existing geofence method for a target wireless device located in an urban environment. As portrayed in FIG. 14C, the least squares geofence method triggers an exit event 141G for the target wireless device two minutes earlier than the conventional geofence method triggers the same exit event 141R.

In accordance with another aspect of the present invention, the least squares geofence method avoids various blunders that are otherwise unavoidable in the existing geofence method. For instance, the existing geofence method occasionally triggers exit events for devices that are stationary within a geofence, whereas the least squares geofence method does not.

Figure 15:
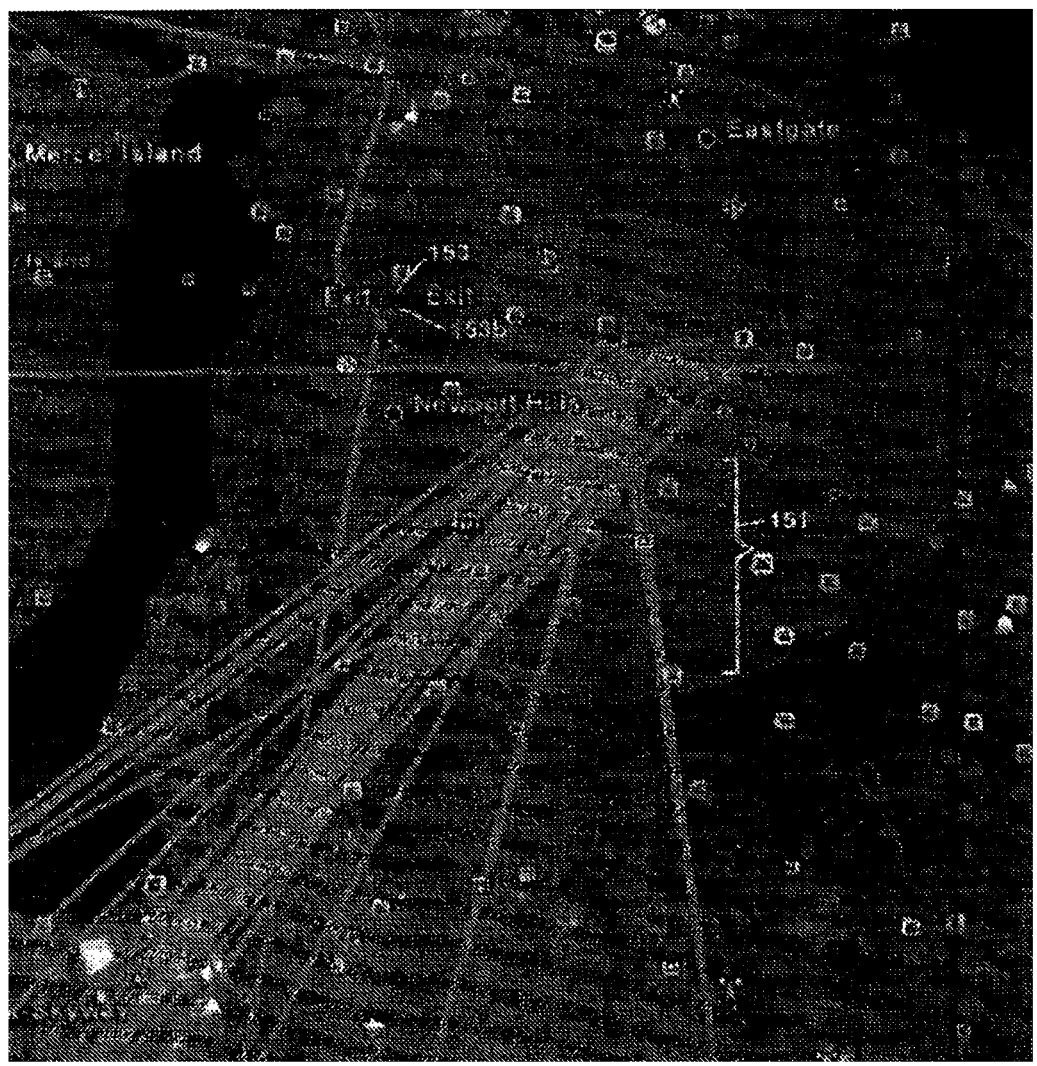
FIG. 15 shows location information for a wireless device that is resident within three defined geofences, in accordance with the principles of the present invention.

FIG. 15 shows location information for a wireless device that is resident within three defined geofences, in accordance with the principles of the present invention.

In particular, FIG. 15 depicts severe location blunders 151 incurred for a device located within three defined geofences. However, despite location blunders, the least squares geofence method does not experience any trigger misfires. Rather, the least squares geofence method triggers two valid exit events 153 once the device exits the inner two geofences, as depicted in FIG. 15.

In accordance with the principles of the present invention, the least squares geofence method does not obtain significantly more locates than the existing geofence method.

For example, the least squares geofence method retrieves sample location points approximately every 3 minutes for a stationary Research In Motion (RIM™) device placed inside a geofence overnight. This 3 minute interval is the same interval the existing geofence method uses to retrieve sample location points for a target wireless device.

FIG. 16 portrays a locations log for an exemplary device that is stationary inside a geofence, in accordance with the principles of the present invention.

In particular, FIG. 16 shows an exemplary locations log 161 of location updates requested by the least squares geofence method for a wireless device that enters a geofence at approximately 0:34 GMT. FIG. 16 additionally depicts five sample location points 163 used to trigger an entry event for that particular wireless device.

FIG. 17 portrays an exemplary locations log for a wireless device that exits a geofence and remains near the boundary of that geofence, in accordance with the principles of the present invention.

In particular, FIG. 17 depicts a locations log 171 of location updates requested by the least squares geofence method for a device that exits a geofence and then remains near the boundary of that geofence. As depicted in FIG. 17, even under boundary conditions, location updates are only requested by the least squares geofence method approximately every 3 minutes. FIG. 17 also depicts five sample location points 173 used to generate an exit event for the corresponding wireless device.

Figure 18:
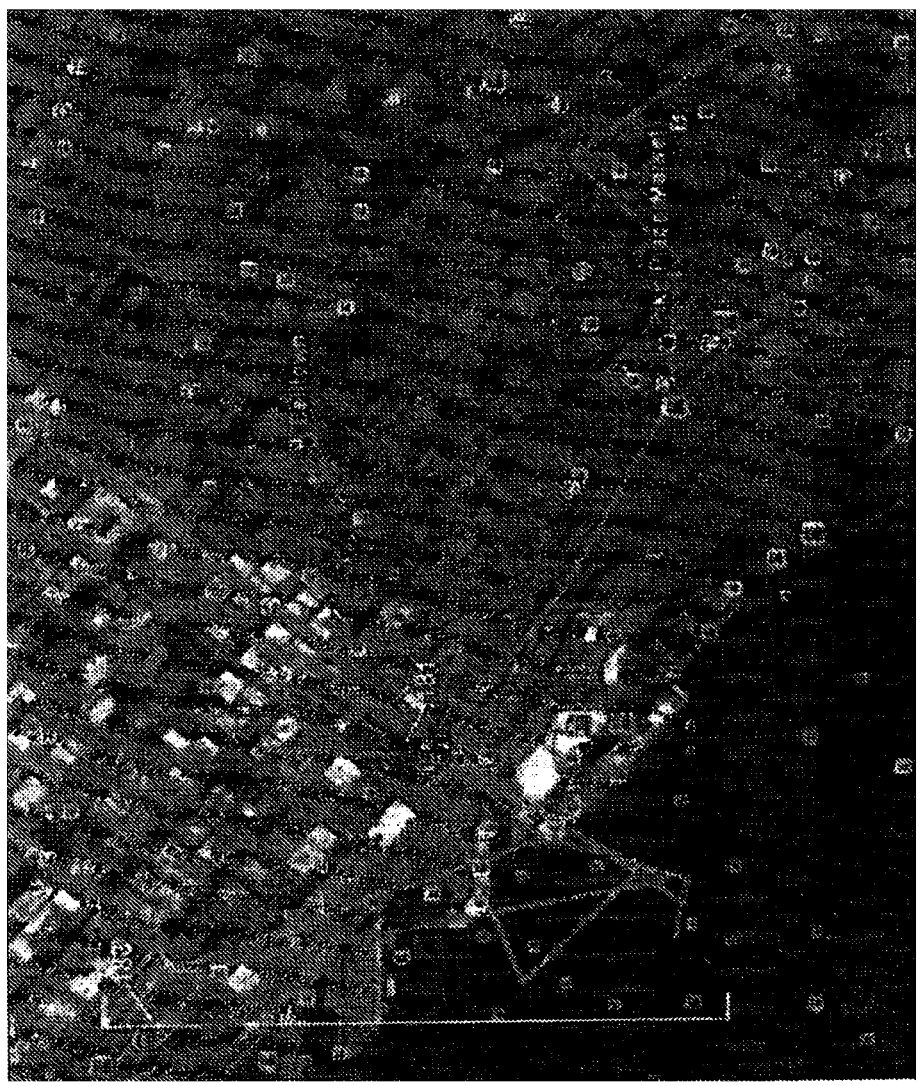
FIG. 18 shows a map of locations relative to the location log depicted in FIG. 17, in accordance with the principles of the present invention.
Figure 19:
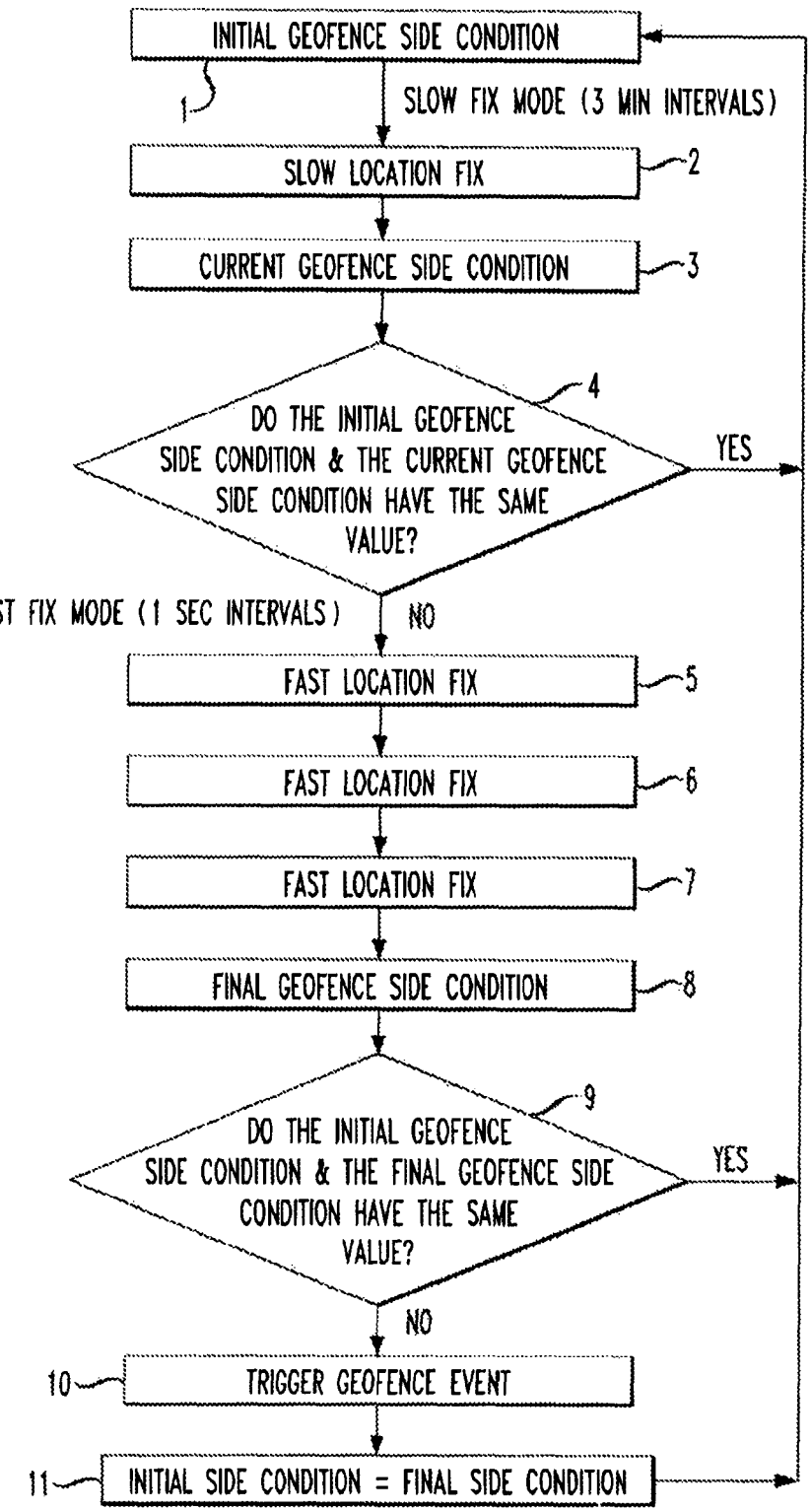
FIG. 19 depicts an exemplary geofence method call flow.
Figure 20:
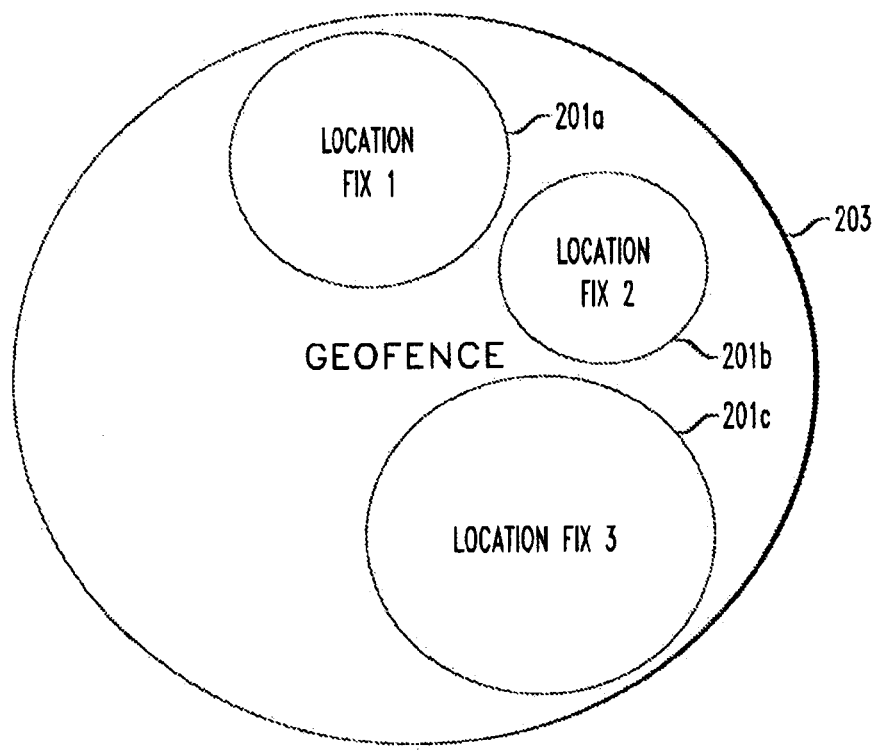
FIG. 20 depicts three exemplary fast location fixes retrieved for a target device located inside a predefined geofence.
Figure 21:
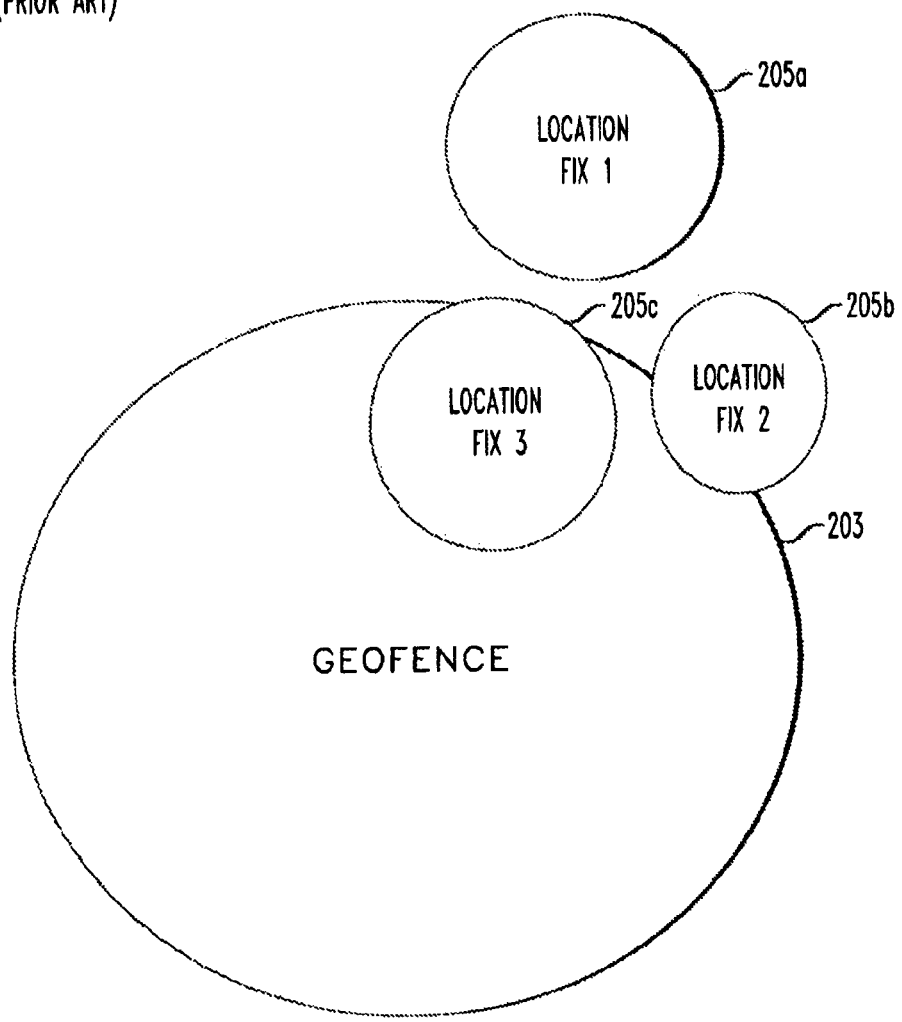
FIG. 21 depicts three exemplary fast location fixes retrieved for a target device located outside a predefined geofence.

FIG. 18 shows a map of locations relative to the location log depicted in FIG. 17.

In particular, FIG. 18 depicts an exit trigger 181 generated for a target wireless device, based on sample location points 173 retrieved for that device and logged in the locations log depicted in FIG. 17. FIG. 18 also depicts subsequent location information 183 retrieved for the relevant target device, relative to location updates indicated in the locations log 171 depicted in FIG. 17.

In accordance with the principles of the present invention, the least squares geofence method increases sensitivity under indoor conditions where GPS is not available, and extracts meaningful information even from poor quality sample location points. In addition, the least squares geofence method is able to obtain a statistical location estimate for a target wireless device based on multiple sample location points, thereby increasing the probability of valid "entry" events under urban or indoor conditions. The existing geofence method, however, is extremely sensitive to position quality under indoor conditions and unable to obtain network locates in many circumstances.

The least squares geofence method is additionally capable of extracting more information from input data than the existing geofence method, thereby rendering location blunders less detrimental to the least squares geofence method. In addition, the present invention only filters extreme blunders, so the model's degree of fit determines whether or not additional blunders are present. Furthermore, the least squares geofence method is able to reduce exit misfires caused by blunders such as cell tower hopping while still allowing the least squares (LS) model to use all location information with accuracies less than 1 km.

Geofence sensitivity is increased in the least squares geofence method, hence extreme data variability (>1 km) becomes a problem when variability straddles a geofence border for a prolonged period of time. As portrayed in FIG. 8, a majority of data variability is captured in a least squares (LS) location estimate computed using 5 sample location points. However, if there are 5 consecutive highly correlated data points far enough inside or outside a predefined geofence, an entry/exit event may be triggered. Although decreasing the sensitivity of the geofence would reduce trigger misfires, decreased sensitivity would also reduce the effectiveness of the geofence. Fortunately, prolonged variability greater than 1 km is not common, and administrators typically center geofences around resting locations.

In accordance with the principles of the present invention, modifications to the GPS fix timeout implemented in fast fix mode does not significantly affect the geofence in the least squares geofence method, because the GPS chip is hot after the first optimal fix in slow fix mode is implemented. Furthermore, GPS fixes are preferably readily available in rural environments. However, should a GPS fix be unavailable, the least squares geofence method may become susceptible to network location biases due to weak cell tower geometry and sparse cell towers in rural environments.

The least squares geofence method has sufficient sensitivity to support quarter mile geofences. Under severe data variation conditions, boundary effects may be significant for quarter mile geofences because 1 km location variations become significant for a quarter mile (805 m) diameter geofence.

The least squares geofence method does not adversely affect battery consumption. The number and frequency of sample location points retrieved for a target wireless device are identical in the least squares geofence method and the existing geofence method under most circumstances. However, the least squares geofence method performs more fast location fixes than the conventional geofence method, thereby resulting in increased battery consumption. However, fast fixes now have a shorter GPS timeout, which reduces battery consumption under urban or indoor conditions.

In accordance with the principles of the present invention, a geofence method and technology that further increases the probability of accurate entry/exit geofence triggers without additionally increasing the probability of inaccurate entry/exit geofence triggers, comprises a Kalman filter geofence method. A Kalman filter geofence method uses a Kalman filter to filter location data retrieved for a target wireless device. Filtered location data is analyzed to determine if a target device has entered or exited a predefined geographic location (i.e. a predefined geofence).

A Kalman filter is an existing algorithm that uses a series of measurements observed over time, containing noise (random variations) and other inaccuracies, to produce estimates of unknown variables. Estimates produced by a Kalman filter tend to be more precise than those based on a single measurement alone. The Kalman filter has numerous applications in technology. For instance, the Kalman filter is commonly used for guidance, navigation, and control of vehicles, aircraft and spacecraft.

The Kalman filter is based on linear dynamic systems discretized in the time domain. At each time increment the dynamic system is modeled by a set of system states and a linear transition function (matrix). The existing Kalman filter model assumes that a true state at time k is evolved from a state at (k−1) according to:

$$X_k = A_k X_{k-1} + B_k u_k + w_k,$$

where $A_k$ is the state transition model applied to the previous state $X_{k-1}$; $B_k$ is the control-input model applied to the control vector $u_k$; and $w_k$ is the process noise which is assumed to be drawn from a zero mean multivariate normal distribution with covariance $Q_k$:

$$w_k \sim N(0, Q_k).$$

At time k, an observation (or measurement) $z_k$ of a true state $X_k$ is made according to:

$$z_k = H_k X_k + v_k,$$

where $H_k$ is the observation model that maps the true state space into the observed space, and $v_k$ is the observation noise (assumed to be zero mean Gaussian white noise) with covariance $R_k$:

$$v_k \sim N(0, R_k).$$

The optimal estimation to the system states is:
Predict:

$$\hat{X}_{k|k-1} = A_k \hat{X}_{k-1|k-1} + B_k u_k$$

$$P_{k|k-1} = A_k P_{k-1|k-1} A_k^T$$

Update:

$$S_k = H_k P_{k|k-1} H_k^T + R_k$$

$$K_k = P_{k|k-1} H_k^T S_k^{-1}$$

$$\hat{X}_{k|k} = \hat{X}_{k|k-1} + K_k (z_k - H_k \hat{X}_{k|k-1})$$

$$P_{k|k} = (I - K_k H_k) P_{k|k-1}$$

Table 6 lists performance of the existing Kalman filter (i.e. ANSI C or Java version) when implemented on an Android device.

TABLE 6

| | |
|---|---|
| Calculation Speed | 50 micro second per location estimate |
| Maximum Stack Size | 100 bytes |
| Maximum heap Size | 150 bytes |

As depicted in Table 6, the Kalman filter (i.e. ANSI C or Java version) has a calculation speed of 50 micro seconds per location estimate, a maximum stack size of 100 bytes, and a maximum heap size of 150 bytes when implemented on an Android device.

In accordance with the principles of the present invention, the Kalman filter geofence method further minimizes the probability of false entry/exit geofence triggers and optimizes energy usage on a target device for geofence related location determinations. A Kalman filter geofence method also overcomes certain limitations of the existing geofence method and the least squares geofence method. For instance, a Kalman filter geofence method is able to address a target device that is moving, as well as a geofence that is moving, whereas both the existing geofence method and the least squares geofence method assume that a target device is static (i.e. not in motion). Hence, the least squares geofence method and the existing geofence method both fail to produce accurate geofence crossing results for a target device in fast moving mode, whereas the Kalman filter geofence method does not.

Moreover, the Kalman filter geofence method can estimate velocity and heading of a moving target to improve location information retrieved for a target wireless device. Yet, the existing geofence method and the least squares geofence method only use raw location data obtained from sensors to make initial judgments of geofence boundary crossing (i.e. to determine an initial geofence side condition). However, raw location data contains position errors ranging from 500 m to several kilometers in areas where GPS signal is not available. When a target device located in an area where GPS signal is not strong or not available, location blunders may cause the least squares geofence method and/or the existing geofence method to determine an inaccurate initial geofence side condition for that target device, which, in turn, may lead to a missed entry/exit geofence trigger.

Furthermore, a Kalman filter geofence method dynamically determines a number of location determinations required to refine an initial judgment of geofence boundary crossing (i.e. an initial geofence side condition) for a target wireless device. Alternatively, the least squares geofence method and the existing geofence method use a pre-defined number of consecutive location determinations to refine an initial geofence boundary crossing judgement (i.e. initial geofence side condition). When location determination is performed by a GPS system with very small uncertainty, a pre-defined number of consecutive location determinations performed thereafter yields only additional energy consumption on a relevant target device.

For a quarter mile geofence, accuracy of a location fix is more sensitive to the least squares geofence method and the existing geofence method than it is to the Kalman filter geofence method.

Figure 22:
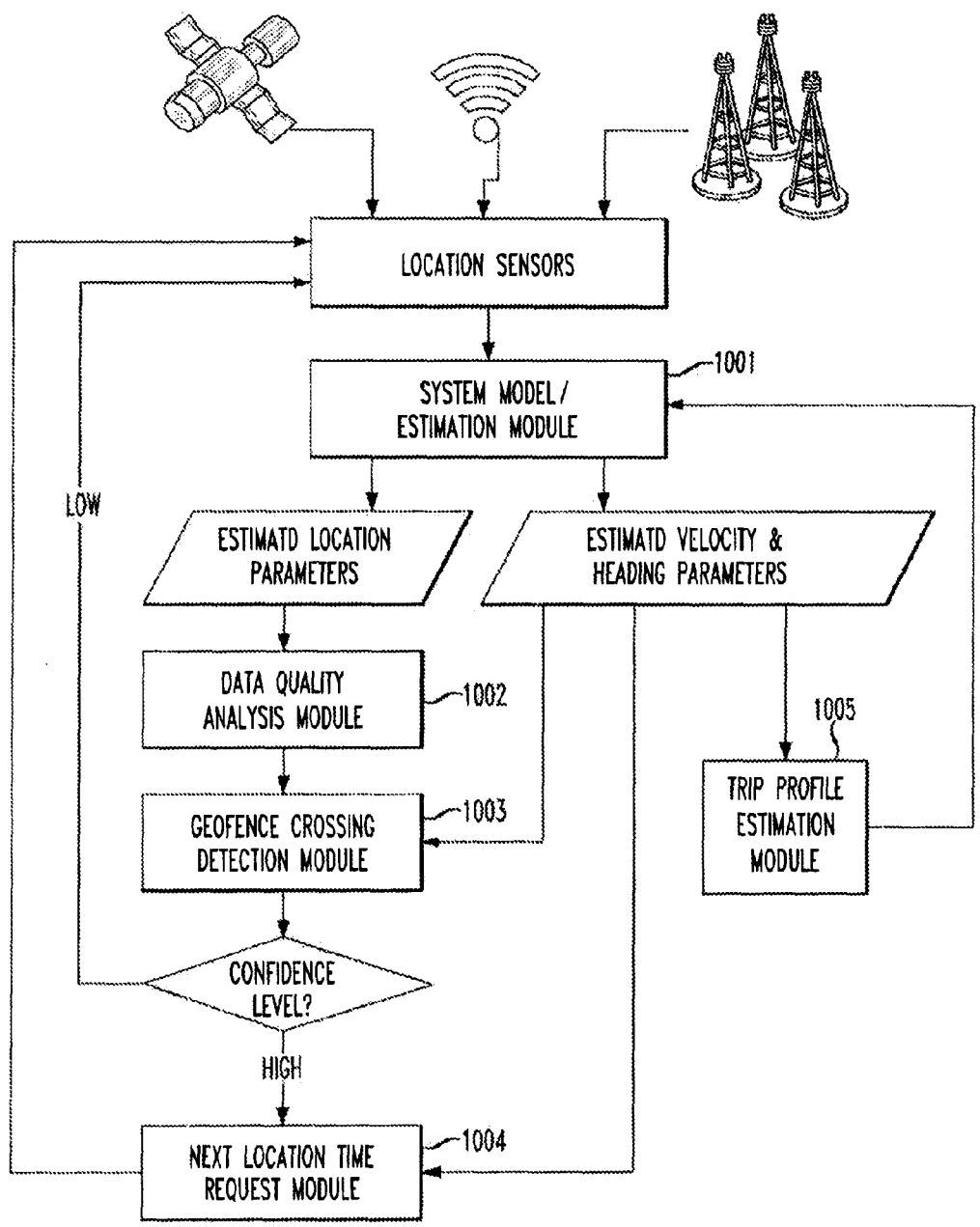
FIG. 22 depicts an exemplary Kalman filter geofence method call flow, in accordance with the principles of the present invention.

FIG. 22 depicts an exemplary Kalman filter geofence method call flow, in accordance with the principles of the present invention.

In particular, the Kalman filter geofence method consists of the following inventive geofence modules: a system model/estimation module 1001, a data quality analysis module 1002, a geofence crossing detection module 1003, a next location time request module 1004, and a trip profile estimation module 1005.

A system model/estimation module 1001 is a Kalman filter geofence module that uses a set of parameters to describe a general dynamic behavior of a target wireless device. Parameters used in the system model/estimation module 1001 include position, velocity and heading. Various location sensors (e.g. GPS, WI-FI, cellular network, etc.) are used as input to the system model/estimation module 1001 to permit a Kalman filter to estimate the dynamics of a target wireless device. This is similar to least squares estimation, except that the present invention appreciates that Kalman filter results in better and more consistent estimation.

Additional sensor sources (e.g. gyros, accelerometers, compass, etc.) on a target wireless device may also be incorporated in to the system model/estimation module 1001 (in addition to sensors listed above (e.g. GPS, WI-FI, cellular network, etc.)) to further enhance system model/estimation module 1001 parameter estimations.

Estimated position parameters (i.e. position estimates) generated by the system model/estimation module 1001 are used for raw sensor data blunder detection and geofence crossing determinations in the inventive Kalman filter geofence method. Moreover, estimated velocity and heading parameters generated by the system model/estimation module 1001 are used to determine a target device dynamic trip profile estimation. A dynamic trip profile estimation is used to refine the system model/estimation module 1001 by restricting a maximum value (e.g. maximum speed) in the system model/estimation module 1001 used to generate parameter estimations for a given target device. Furthermore, in accordance with the principles of the present invention, estimated velocity and heading parameters are used for geofencing and for trip profile, and additionally optimize battery consumption on a target wireless device.

Figure 23:
FIG. 23 depicts an exemplary position estimate generated by the system model/estimation module for a target wireless device, in accordance with the principles of the present invention.

FIG. 23 depicts an exemplary position estimate generated by the system model/estimation module for a target wireless device, in accordance with the principles of the present invention.

In particular, FIG. 23 portrays raw cellular network location data 231 retrieved for a target wireless device in fast moving mode (on a bus or a train). Further, FIG. 23 additionally depicts system model/estimation module 1001 estimated position results 233 generated for that same target wireless device. As depicted in FIG. 23, estimated results 233 generated by the system model/estimation module 1001 are much closer to the bus or train route 235 traced by the target wireless device, than raw cellular network location data 231 retrieved for that particular target device.

Velocity and heading estimates generated by the system model/estimation module 1001 in the Kalman filter geofence method permit accurate entry/exit geofence triggers to be generated for a target device in motion.

Figure 24:
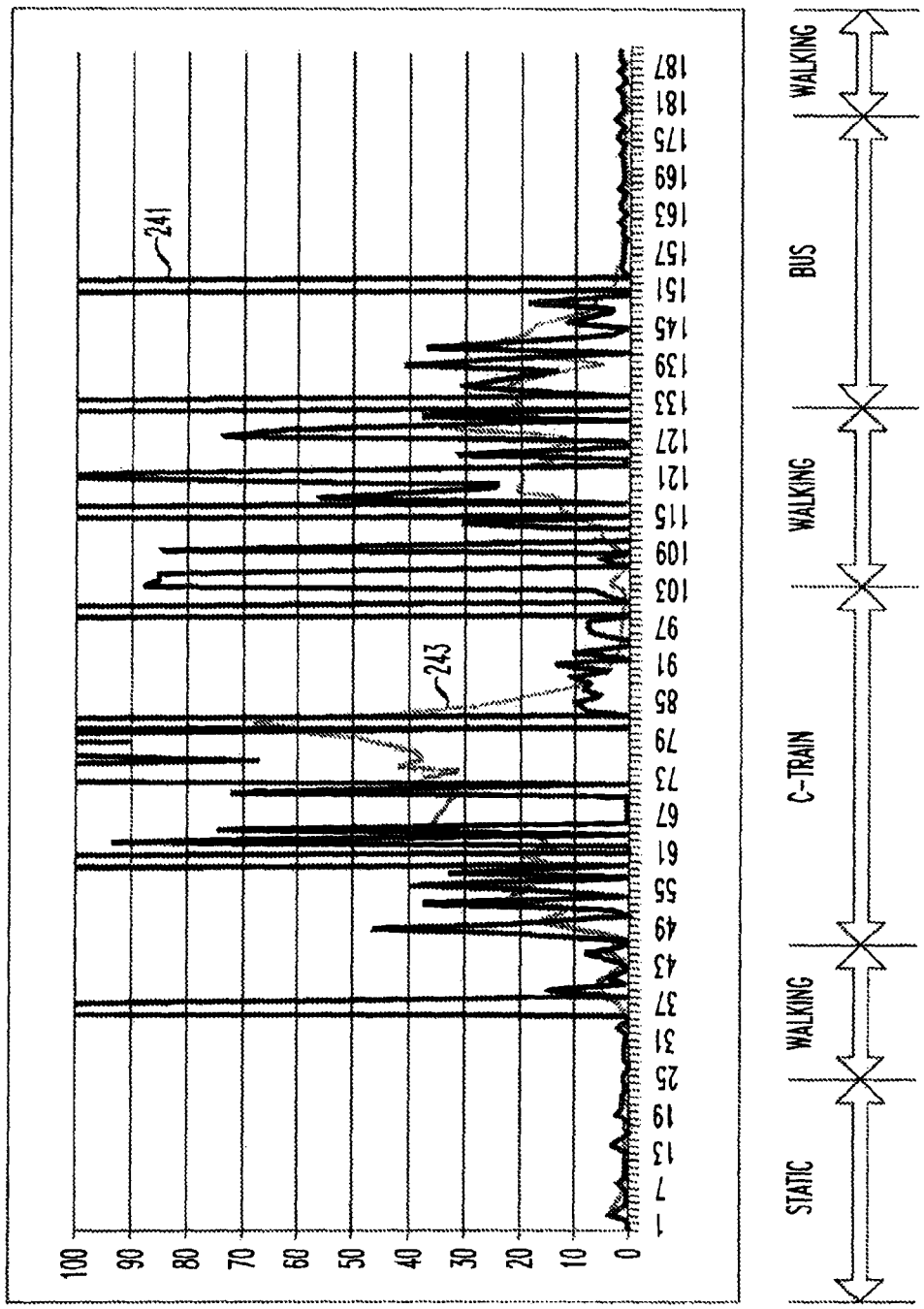
FIG. 24 depicts an exemplary velocity estimate produced by a system model/estimation module, in accordance with the principles of the present invention.

FIG. 24 depicts an exemplary velocity estimate produced by a system model/estimation module, in accordance with the principles of the present invention.

In particular, FIG. 24 portrays raw velocity data 241 retrieved for a target wireless device and a velocity estimate 243 generated by the system model/estimation module 1001 for that same target wireless device. Estimated velocity information 243 portrayed in FIG. 24 represents the target device's actual velocity much better than raw velocity data 241 retrieved for that same target wireless device.

In accordance with the principles of the present invention, a data quality analysis module 1002 is an inventive Kalman filter geofence module that analyzes a position estimate output from the system model/estimation module 1001 to statistically determine quality of location data retrieved for a target wireless device. The data quality analysis module 1002 additionally uses position estimates generated by the system model/estimation module 1001 to detect location blunders in location data retrieved for a target wireless device. The problem with previous geofence algorithms is that there is no way to mathematically calculate the reliability of the geofence entry/exit. With least squares and Kalman filter, statistical tools are introduced to calculate the reliability of an entry/exit geofence.

Exemplary quality analysis and blunder detection criteria employed by the data quality analysis module 1002 is described by the following equation:

$$\|X_k - z_k\| > K\Sigma,$$

where $X_k$ is an estimated location generated by the Kalman filter geofence method, $z_h$ is an observed location retrieved from the network, $\Sigma$ is an estimated accuracy generated by the Kalman filter geofence method, and K is a constant.

Figure 25:
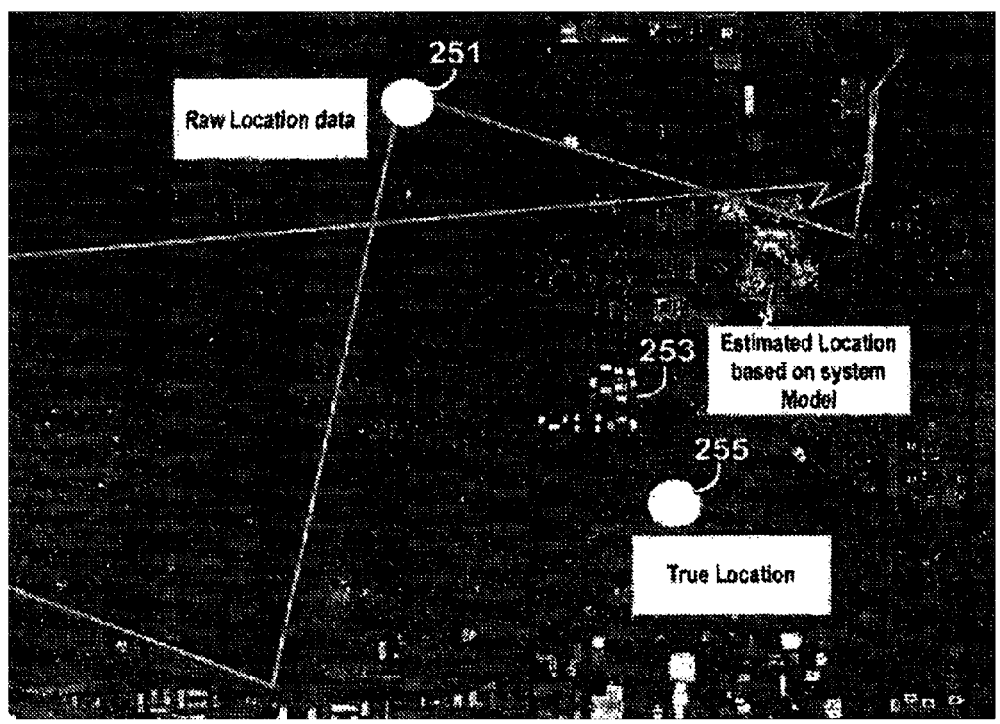
FIG. 25 depicts exemplary blunder detection performed by the Kalman filter geofence method on cell network location data collected for a target wireless device, in accordance with the principles of the present invention.

FIG. 25 depicts exemplary blunder detection performed by the Kalman filter geofence method on cell network location data collected for a target wireless device, in accordance with the principles of the present invention.

In particular, FIG. 25 depicts a position estimate 253 generated by the system model/estimation module 1001 for a target wireless device. Moreover, FIG. 25 additionally depicts a raw position 251 retrieved from a cell network location sensor for that same target wireless device. The raw position 251 is an outlier located 1.5 km away from the position estimate 253 computed for the target wireless device. In accordance with the principles of the present invention, the Kalman filter geofence method is able to correct the outlier 251 present in network location data retrieved for the target wireless device, and generate a position estimate 253 that is closer to the device's actual position 255. As depicted in FIG. 25, the position estimate 253 generated by the system model/estimation module 1001 in the Kalman filter geofence method is much closer to the device's true position 255 (on a highway) than the raw position 251 retrieved via the cell network location sensor.

In accordance with the principles of the present invention, an inventive geofence crossing detection module 1003 is implemented in the Kalman filter geofence method following quality analysis. The geofence crossing detection module 1003 uses a position estimate generated by the system model/estimation module 1001 to determine if a relevant target device has crossed a geofence boundary.

For a given confidence level, the Kalman filter geofence method dynamically determines a number of location fixes required to refine an initial geofence boundary crossing judgment (i.e. initial geofence side condition). In particular, the Kalman filter geofence method dynamically determines the quantity of location fixes required to refine an initial judgment of geofence boundary crossing for a given target device based on the uncertainty of a position estimate computed for that particular device. Dynamically determining quantity of location fixes required for a target wireless device conserves energy consumption and improves accuracy of location information retrieved for that particular target device. Least squares uses fixed number of fast cycles, while the inventive Kalman filter techniques dynamically determine the number of fast cycles required.

For instance, for a target device located in an area where only cellular network location determination is available, a dynamic number of location fixes reduces the probability of missed boundary crossing alerts for that particular target device. Furthermore, for a target device located in an area where GPS signal is available, a dynamic number of location fixes reduces the number of location fixes performed for that target device, thereby conserving the device's energy.

In accordance with the principles of the present invention, a next location time request module 1004 dynamically determines time intervals between location fixes implemented in the inventive Kalman filter geofence method. In particular, the next location time request module 1004 utilizes velocity and heading parameter estimations generated by the system model/estimation module 1001 to dynamically determine an appropriate time interval to implement prior to retrieving a subsequent location fix. For instance, if a target device is departing in a direction opposite a geofence boundary, the next location time request module 1004 may increase the time interval between location fixes to save energy on that target device. In an alternative embodiment, if a target device is departing in a direction opposite a geofence boundary, the next location time request module 1004 may select a more energy efficient location fix (e.g. a cellular network location fix instead of a GPS location fix) for that particular target device, rather than increasing a time interval between location fixes (as long as location uncertainty does not impact a geofence boundary crossing confidence level).

In accordance with the principles of the present invention, a trip profile estimation module 1005 analyzes historical heading and velocity parameter estimates output by the system model/estimation module 1001 to establish a trip profile model for a target wireless device. Trip profile information may be used as feedback to the system model/estimation module 1001 to further refine dynamic parameters for a target wireless device. For instance, trip profile information may be used to implement a constrained state Kalman filter estimation.

A constrained state Kalman filter estimation is described by the following equation:

$$X_k = A_k X_{k-1} + B_k u_k + w_k,$$

and the observation is:

$$z_k = H_k X_k + v_k,$$

with the constraints:

$$\|\dot{X}\| < V_{profile},$$

where $\dot{x}$ is the velocity states in the Kalman dynamic model and $V_{profile}$ is the velocity defined by the trip profile.

For a quarter mile geofence, accuracy of a location fix is more sensitive to the least squares geofence method and the existing geofence method that it is to the Kalman filter geofence method.

The Kalman filter geofence method helps the quarter mile geofence by using a Kalman filter estimated location to decide a geofence side change instead of using raw location data. The Kalman filter geofence method gives better estimates of a network location of a target device, thereby reducing the probability of generating incorrect entry/exit geofence triggers.

The Kalman filter geofence method further helps the quarter mile geofence by detecting location blunders in location data retrieved for a target wireless device. The Kalman filter geofence method detects location blunders by comparing raw location data retrieved for a target wireless device to a position estimate computed in the system model/estimation module 1001 for that same target wireless device.

Moreover, the Kalman filter geofence method helps the quarter mile geofence by utilizing velocity and heading information to generate geofence crossing determinations, optimize battery consumption, and establish a target movement profile for a relevant target device.

Figure 26:
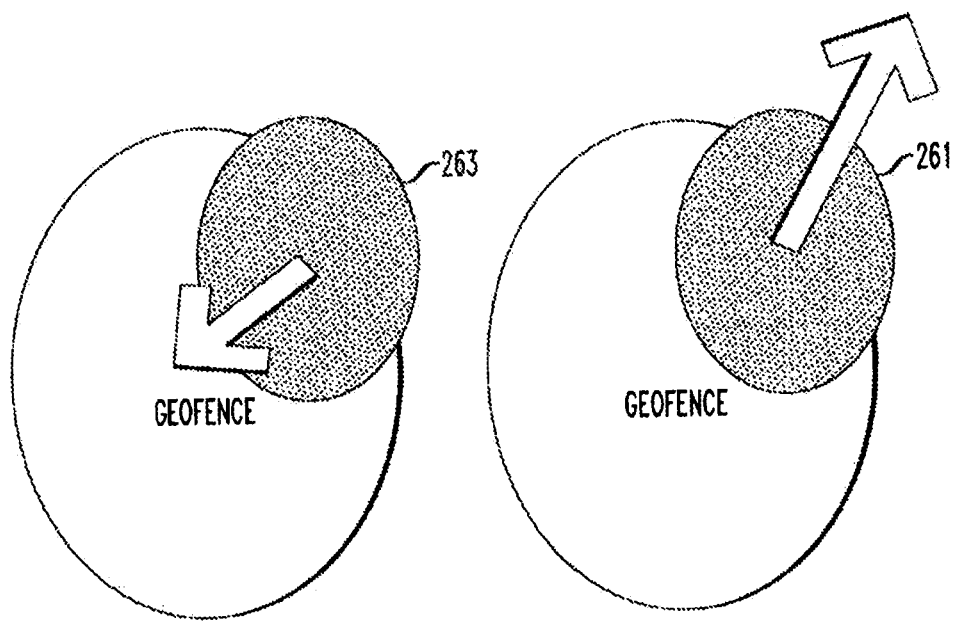
FIG. 26 depicts an illustrative example of heading information retrieved for a target wireless device, in accordance with the principles of the present invention.

FIG. 26 depicts an illustrative example of heading information retrieved for a target wireless device, in accordance with the principles of the present invention.

In particular, when a target device is entering 263 a geofence or departing 261 from a geofence (as depicted in FIG. 26) under boundary condition, the Kalman filter geofence method can request additional location fixes for that target wireless device based on relevant velocity and heading information maintained thereon. Additional location fixes permit the Kalman filter geofence method to further evaluate a relevant geofence side change condition. Moreover, when a target device is departing from a geofence 261, the Kalman filter geofence method can relax a location fix interval to reduce the number of location fixes retrieved for that target wireless device, thereby conserving that device's battery consumption. Furthermore, velocity and heading information may be used to establish a movement profile for a target wireless device. A movement profile is used to optimize the dynamic model and optimize error estimation, in accordance with the principles of the present invention. For example, velocity and heading parameter estimations may be used in a constrained state Kalman filter estimation.

The least squares geofence method and the existing geofence method may be easily modified to incorporate a Kalman filter. In fact, a Kalman filter may easily be implemented in any suitable geofence method.

Figure 27:
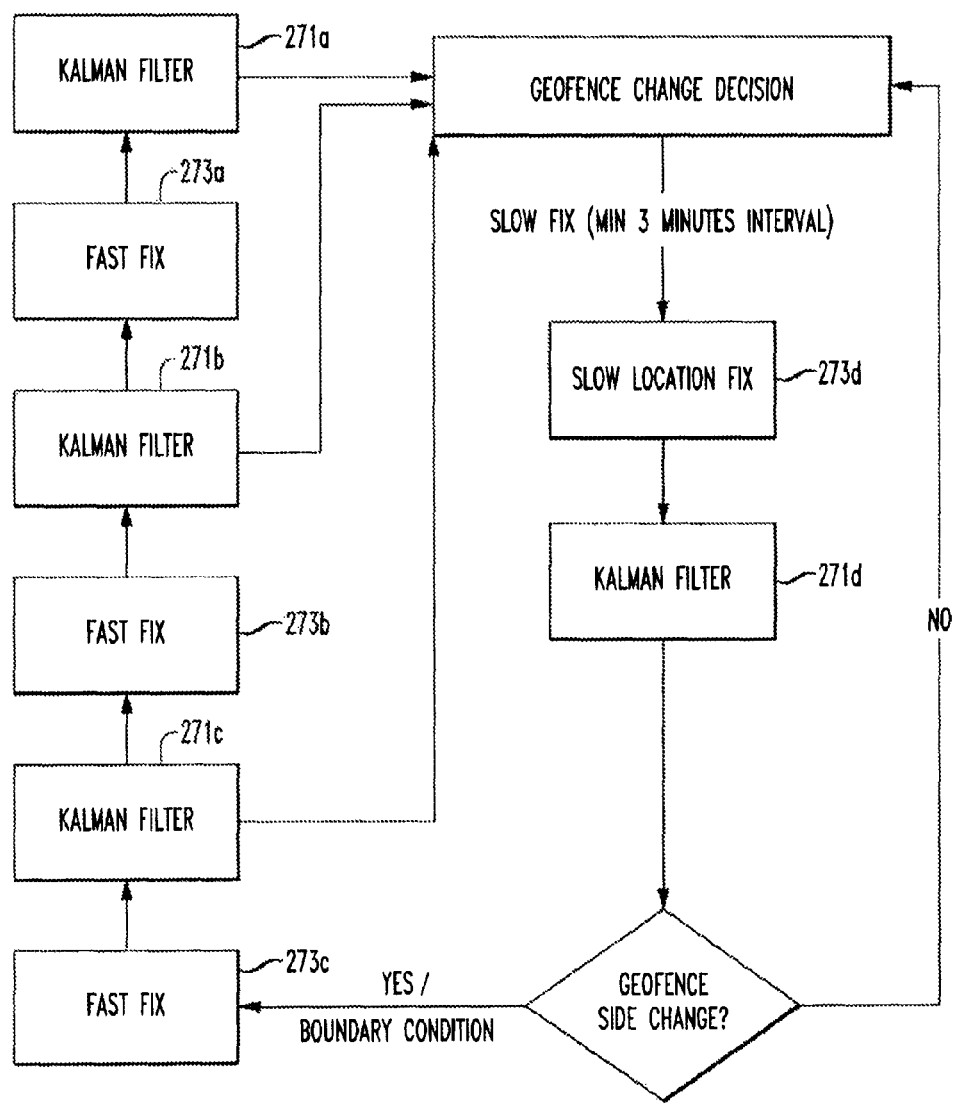
FIG. 27 depicts exemplary implementation of a Kalman filter in an existing geofence method, in accordance with the principles of the present invention.

FIG. 27 depicts exemplary implementation of a Kalman filter in an existing geofence method, in accordance with the principles of the present invention.

As depicted in FIG. 27, a Kalman filter is employed in an existing geofence method by processing every location fix 273 retrieved for a target wireless device by a Kalman filter 271 before determining any side changes or geofence trigger decisions for that particular target wireless device.

Although the present disclosure describes the Kalman filter geofence method and system using a single location target (target device) and a single pre-defined geographic region (the geofence) as example, one of ordinary skill in the art will readily recognize that the disclosure can be easily applied to combinations of any arbitrary number of target devices and geofences.

The dynamic system model/estimation module 1001 may be implemented in various applications to provide improved location estimation where periodic location determination data is available, e.g., turn-by-turn navigation, vehicle tracking, etc.

The Kalman filter geofence method has particular applicability to caretaker services and location aware mobile marketing. For instance, the Kalman filter geofence method permits family members, parents, employers, etc., to monitor location information for children, family members, friends, employees, etc. Moreover, a Kalman filter geofence method permits merchants and/or marketers to push information (e.g. marketing information, weather, traffic warnings, construction updates, road conditions, safety warnings, etc.) to a device once that device crosses a relevant geofence boundary.

While the invention has been described with reference to the exemplary embodiments thereof, those skilled in the art will be able to make various modifications to the described embodiments of the invention without departing from the true spirit and scope of the invention.

What is claimed is:

1. A method of geofencing, comprising:
    a Kalman filter module to filter a plurality of past individual location fixes retrieved for a target device and produce a latest Kalman-filtered location of said target device;
    determining a predictive heading and velocity of said target device based on a plurality of Kalman-filtered locations;
    detecting a geofence boundary crossing by said target device based on said latest Kalman-filtered location of said target device together with said predictive heading and velocity; and
    dynamically determining time intervals between location fixes for said Kalman filter module using said predictive heading and velocity of said target device.

2. The method of geofencing according to claim 1, further comprising:
    detecting a location blunder of said latest Kalman-filtered location using said latest kalman-filtered location.

3. The method of geofencing according to claim 1, further comprising:
    dynamically determining an appropriate number of location fixes for said target device, to determine said latest Kalman-filtered location.

4. The method of geofencing according to claim 1, further comprising:
dynamically selecting an energy efficient location technique based on said latest Kalman filtered location, and said predictive heading and velocity relative to said geofence.

5. The method of geofencing according to claim 1, further comprising:
reducing a time interval between location fixes for said target device when said latest Kalman-filtered location is outside a given geofence.

6. The method of geofencing according to claim 1, further comprising:
establishing a trip profile model for said target device based on historical predictive heading and velocity of said target device.

\* \* \* \* \*